United States Patent [19]

Buxton et al.

[11] Patent Number: 6,094,197
[45] Date of Patent: Jul. 25, 2000

[54] GRAPHICAL KEYBOARD

[75] Inventors: William A. S. Buxton, Toronto, Canada; Gordon P. Kurtenbach, Mountain View, Calif.

[73] Assignee: Xerox Corporation, Stamford, Conn.

[21] Appl. No.: 08/443,259

[22] Filed: May 17, 1995

Related U.S. Application Data

[63] Continuation of application No. 08/171,288, Dec. 21, 1993, abandoned.

[51] Int. Cl.[7] .................................................. G09G 5/00
[52] U.S. Cl. ......................... 345/358; 345/168; 345/179; 341/22
[58] Field of Search .................................... 345/156, 157, 345/168, 169, 170, 172, 173, 174, 175, 176, 179, 180, 181, 182, 183; 341/22, 23; 170/18, 19; 395/326, 335, 347, 350, 351, 352; 382/188, 189

[56] References Cited

U.S. PATENT DOCUMENTS

| | | | |
|---|---|---|---|
| 4,725,694 | 2/1988 | Auer et al. | 345/173 |
| 5,050,105 | 9/1991 | Peters | 345/157 |
| 5,148,155 | 9/1992 | Martin et al. | 178/18 |
| 5,258,748 | 11/1993 | Jones | 345/172 |
| 5,276,794 | 1/1994 | Lamb | 345/173 |
| 5,347,295 | 9/1994 | Agulnick et al. | 345/156 |
| 5,603,053 | 2/1997 | Gough et al. | 345/179 |

FOREIGN PATENT DOCUMENTS

| | | | |
|---|---|---|---|
| 0 603 669A1 | 12/1993 | European Pat. Off. | G06F 3/033 |
| 0144817 | 7/1985 | Japan . | |
| 60-144817 | 7/1985 | Japan . | |
| 0011144 | 11/1989 | WIPO | 178/18 |
| 89/11144 | 11/1989 | WIPO | 178/18 |
| 92/09944 | 6/1992 | WIPO | G06F 3/033 |

OTHER PUBLICATIONS

Knodt, Ruediger W. "Smart Virtual Keyboard System Suitable for Mouse or Stylus Entry," Xerox Disclosure Journal, vol. 18(3):245–245, May/Jun. 1993.

Kurtenbach et al. "Issues in Combining Marking and Direct Manipulation Techniques," User Interface Software and Technology (UIST), Hilton Head, SC (Nov. 11–13, 1991), 137–144.

Kurtenbach, Gordon P. "The Design and Evaluation of Marking Menus," Doctrate Thesis, Graduate Department of Computer Science, University of Toronto, 1993.

Kurtenbach, Gordon "Making Marks Self–Revealing," SIGCHI Bulletin, vol. 23(4):60–61 (Abstract) (Oct. 1991).

Kurtenbach et al. "An Empirical Evaulation of Some Articulatory and Cognitive Aspects of Marking Menus," Human–Computer Interaction 8:1–23 (1993).

Robertson et al., "Buttons as First Class Objects on an X Desktop," user Interface Software and Technology (UIST), Hilton Head, SC (Nov. 11–13, 1991), 35–44.

*Primary Examiner*—Steven Saras
*Attorney, Agent, or Firm*—Townsend & Townsend Crew LLP

[57] ABSTRACT

A system and method for a graphical keyboard that benefits from the expressive power and intuitive ease of use associated with pen strokes and gestures, yet does not require complex character-recognition software. The graphical keyboard responds differently to different kinds of pen strokes. For example, lowercase "a" is entered by tapping a stylus on the "a" key of the graphical keyboard. Uppercase "A" is entered by an upward stroke initiated over the "a" key. Likewise, by stroking in other directions, a user can express other modifiers to the basic character, such as "control", "alt", "command," etc. Also, strokes in distinct directions can be used to express space, backspace, delete, and return characters, for example. Multiple strokes can be applied in sequence to a single key to express multiple modifiers. Visual feedback of pen strokes can be provided in the form of marks made by the pen. Pop-up menus can be used to provide help with and to facilitate memorization of command strokes and stroke sequences. The graphical keyboard thus lets the expert user proceed by "feel," and prompts the novice user when and as necessary.

18 Claims, 20 Drawing Sheets

GRAPHICAL KEYBOARD

This is a continuation Ser. No. 08/171,288, filed Dec. 21, 1993, now abandoned.

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserve all copyright rights whatsoever.

SOFTWARE

The application recites provides a source code software program for implementation of an embodiment of the method of the invention on a digital computer. The source code includes a single file written in the HyperCard scripting language. The code runs under the HyperCard program (version 2.0 or higher) for Apple Macintosh computers (Macintosh II or better hardware running System 7.0 or higher operating software), well known to those of skill in the art.

The source code represents unpublished work that is Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

Although a particular software implementation is provided, it will be apparent to those of skill in the art that a wide variety of programming languages and hardware configurations can readily be used based on this disclosure without departing from the scope of the invention.

BACKGROUND OF THE INVENTION

The present invention relates to graphical user interfaces and more particularly to graphical user interfaces for pen-based computing.

Pen-based computing is becoming increasingly popular. The user of a pen-based computer inputs commands and data into the computer using a pen or stylus, typically by printing or writing characters with the pen or stylus on the computer's display screen in a manner analogous to printing or writing with a pen on ordinary paper. Certain commands can be entered as pen strokes (gestures); for example, a word may be deleted by crossing it out, or a file may be opened by writing an "o" on its representative icon. Examples of pen-based computing are found in systems ranging from palm-sized personal digital assistants, through slate-sized machines such as notepad computers, and up to wall-sized interactive displays. Also, pen-based interfaces can sometimes be added or retrofitted to computer systems not originally designed to be pen-based, such as certain personal computer systems.

The usefulness of pen-based computing is limited because of the limited capabilities of character recognition software. In many pen-based systems, the user cannot write in cursive handwriting, but must print. This slows down input. Furthermore, the system has difficulty in recognizing printed characters. Consequently, the user must print carefully (viz., slowly) and often must print in special windows and within designated boxes, and the system can require special training for each individual user. Even so, character recognition performance can be relatively poor. In addition, pen-based systems that use character recognition do not adapt well to run on conventional computer workstations equipped with a mouse, for example.

Because of the limitations of the character-recognition approach to pen-based input, an alternative approach is sometimes used. In this approach, a graphical keyboard, visually analogous to the conventional mechanical (typewriter) keyboard commonly used for input in non-pen-based computer systems, appears on the computer display. The user enters text by using the stylus to tap on desired keys of the graphical keyboard.

The graphical-keyboard approach offers certain advantages over the character-recognition approach. Entering data through a graphical keyboard can be faster than printing (especially with numeric keypads), can be less susceptible to errors when properly implemented (i.e., when the graphical keys are not too small), and does not require the system to be specially trained for each individual user. Moreover, the approach is simple to implement and integrate into existing software applications.

Unfortunately, known graphical keyboards suffer from numerous drawbacks. Although the graphical keyboard is visually analogous to a mechanical keyboard, it is functionally far more limited. With a graphical keyboard, a user cannot "touch type" using all fingers of both hands, but instead must "hunt and peck" with the pen or stylus, as if typing with one finger on a mechanical keyboard. Typing speed on the graphical keyboard is constrained by the time required for the user to move the finger/stylus from key to key on the keyboard. Also, the user cannot tap multiple keys simultaneously. In particular, the user cannot tap a modifier key, such as the "shift," "ctrl," "option," or "alt" key, at the same time as an ordinary key, such as a letter or number key, but instead must first tap the modifier key and then tap the letter or number key. In some systems the user must tap the modifier key once to set the modifier, tap the letter or number key, and then tap the modifier key again to release the modifier (for example, tap "shift," "a," "shift" to input an uppercase "A". This can be especially awkward when multiple modifiers must be composed to form a single character (for example, a doubly modified character such as ctrl-alt-x or a triply modified character such as ctrl-alt-X).

Another problem with the graphical keyboard approach is that it places a heavy visual load on the user. Whereas with a mechanical keyboard, the user can memorize commonly used sequences of keystrokes and perform them "by feel" without looking at the keyboard, with the graphical keyboard the user typically must look at the display before each tap of the stylus to ensure that the stylus is correctly placed. Furthermore, the graphical keyboard tends to take up a large portion of the screen display, in part because the keyboard contains many or all of the modifier and function keys found in its mechanical counterpart.

Because of its drawbacks, the graphical-keyboard approach to pen-based input is often considered cumbersome, and is used in pen-based computing systems only as a fallback when character recognition fails or is insufficiently reliable. The character-recognition and graphical-keyboard approaches to pen-based computing are typically seen as mutually exclusive alternatives, not as complements. In particular, it has not been possible to combine the intuitive ease of use promised (if not always afforded) by the character-recognition approach with the speed, robustness and ease of implementation offered by the graphical keyboard approach.

SUMMARY OF THE INVENTION

The present invention is a graphical keyboard that permits the user to do more than simple key-tapping. It lets the expert user proceed by "feel," and prompts the novice user when and as necessary. The graphical keyboard benefits from the expressive power and intuitive ease of use associated with pen strokes and gestures, yet does not require complex character-recognition software.

The graphical keyboard of the invention responds differently to different kinds of pen strokes. For example, lowercase "a" is entered by tapping a stylus on the "a" key of the graphical keyboard. Uppercase "A" is entered by an upward stroke initiated over the "a" key. Likewise, by stroking in other directions, a user can express other modifiers to the basic character, such as "control", "alt", "command," etc. Also, strokes in distinct directions can be used to express space, backspace, delete, and return characters, for example. Multiple strokes can be applied in sequence to a single key to express multiple modifiers. Visual feedback of pen strokes can be provided in the form of marks made by the pen. Pop-up menus can be used to provide help with and to facilitate memorization of command strokes and stroke sequences.

In another aspect, the present invention provides an improved method for entering characters into a pen-based computer using a graphical keyboard.

A further understanding of the nature and advantages of the invention will become apparent by reference to the remaining portions of the specification and drawings.

DESCRIPTION OF SPECIFIC EMBODIMENTS

1. Introduction

The present invention provides a system and method for an improved graphical keyboard that responds differently to different kinds of pen strokes. By applying appropriate strokes, the user can easily type characters that on mechanical keyboards are typed by pressing multiple keys simultaneously. Also, the user can type certain frequently used keys, such as space, backspace, delete, and return, from anywhere on the keyboard. Using pen strokes makes typing easier and faster, reduces the visual load on the user, and makes it possible for the keyboard to take up less space in the screen display.

2. Examples

Figure 1:
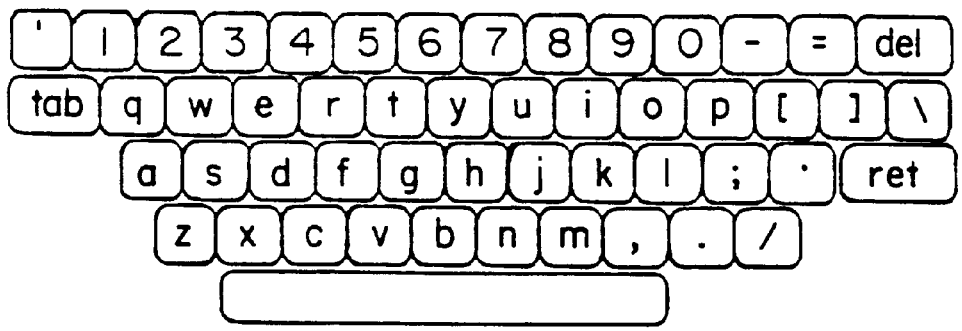
FIG. 1 illustrates a sample graphical keyboard.

To understand the invention, it is helpful to begin with some illustrative examples of its use, as depicted in FIGS. 1–10. A displayed image of a sample graphical keyboard according to the invention is shown in FIG. 1. Tapping on any of the keys with the pen or stylus has the same effect as pushing the analogous key on a mechanical keyboard. Thus to enter a lowercase character, a digit, or another unmodified character such as a period or comma, the user simply taps the desired key.

Figure 2:
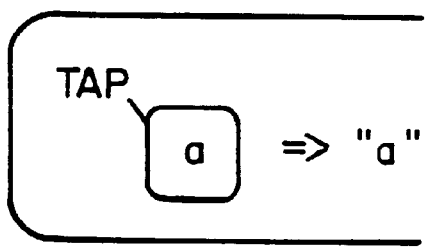
FIG. 2 schematically depicts how a lowercase character can be entered by tapping a key of the graphical keyboard of the invention.
Figure 3:
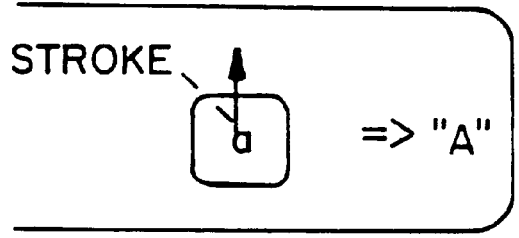
FIG. 3 schematically depicts how a uppercase character can be entered by an upward stroke on a key of the graphical keyboard of the invention.

To enter an uppercase character, rather than tapping, the user makes an upward stroke, initiated on the desired key. For example, as illustrated in FIG. 2, tapping on the "a" key results in "a." An upward stroke on "a" results in "A" (FIG. 3).

Figure 4:
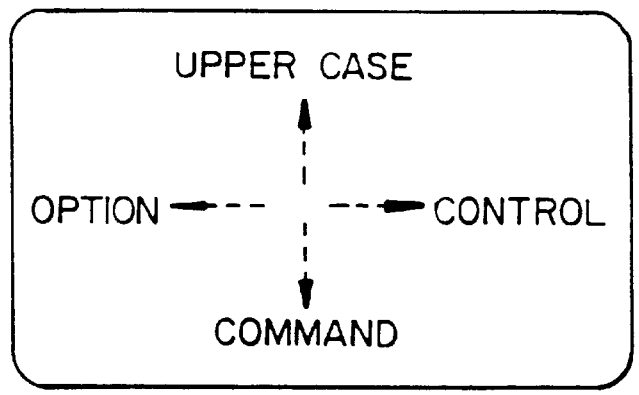
FIG. 4 schematically depicts how each modifier can be distinguished by the direction of its particular stroke.

The user accesses other modifier keys, such as control, alternate, option, or command, in a similar manner. Each modifier is distinguished by the direction of its particular stroke. An example mapping is shown in FIG. 4. According to the mapping of FIG. 4, a stroke to the right indicates the control ("ctrl") modifier. Thus a rightward pen stroke initiated over the character "c" causes the graphical keyboard to output the character "ctrl-c." A stroke to the left indicates the option modifier, and a downward stroke indicates the command modifier.

Figure 5:
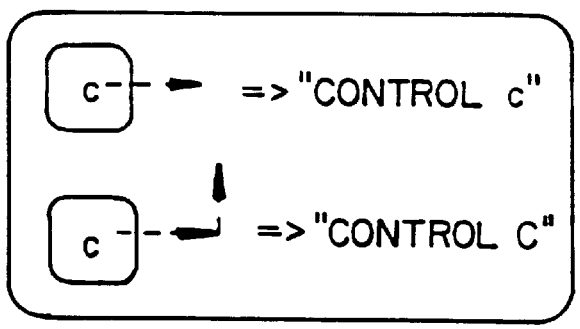
FIG. 5 schematically depicts an example of how modifiers are combined.

Modifiers can easily be combined. For example, once again applying the mapping of FIG. 4, a stroke to the right, starting on the character "c," followed by an upward stroke expresses "ctrl-C," as distinct from "ctrl-c." This is illustrated in FIG. 5.

Figure 6:
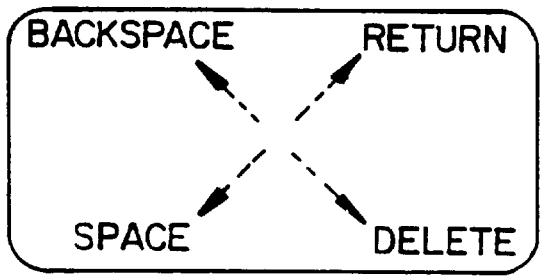
FIG. 6 schematically depicts an example of how certain frequently used keys can be represented as diagonal strokes.

Additional stroke directions can be used to substitute for certain frequently used keys. For example, pen strokes in the diagonal directions can be used to express space, backspace, delete, and return. A possible layout of these commands is shown in FIG. 6. This class of strokes is distinct from the modifier strokes discussed above in connection with FIGS. 3, 4, and 5, in that the meaning of these strokes is not affected by where the stroke is made. Thus a diagonal stroke up and to the left is interpreted in the mapping of FIG. 6 as a backspace regardless of whether it is made on the "aa" key, the "c" key, or any other key of the graphical keyboard.

Visual feedback can assist the user in applying pen strokes to the graphical keyboard. As the user moves the pen across the screen, a line appears on the screen to show where the pen has been, as though the pen contained ink that left a mark on the screen. Once the pen stroke is recognized, the character is entered and the "ink trail" disappears. This is illustrated, for example, in FIG. 8.

Figure 7:
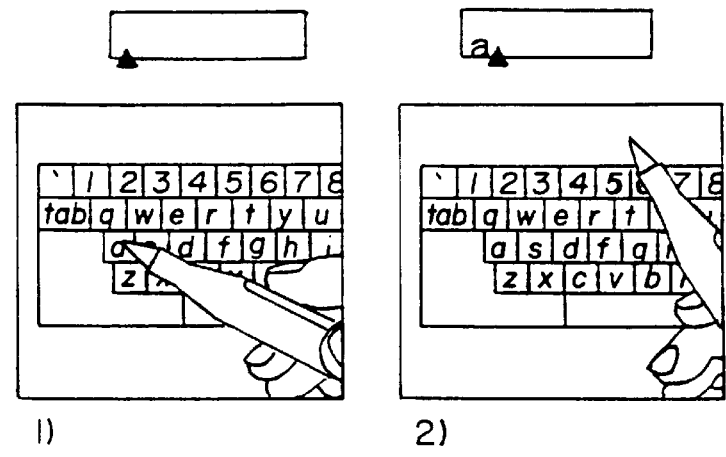
FIG. 7 is a series of views in which a user enters a lowercase character by tapping a key of the graphical keyboard.

Each of FIGS. 7–10 is a series of views showing how a user enters input into the graphical keyboard of the invention. The series of two views of FIG. 7 shows a user entering a lowercase character using the graphical keyboard of the invention. The user does this by tapping the desired key of the graphical keyboard with the pen or stylus. More precisely, the user taps the pen against the surface of the screen on which the keyboard image of the graphical keyboard is displayed, with the point of the pen striking the screen surface in proximity to the location of the desired key within the keyboard image.

In the first view of FIG. 7, the user places the pen momentarily on the key corresponding to the letter or other character to be entered (an "a" in this example). The key is highlighted in the display. The character buffer, which is represented by the small rectangle next to the view of the keyboard, pen, and user, is empty at this stage. In the second view, the user removes the pen from the graphical keyboard, thereby completing the tapping motion. The graphical keyboard produces the character "a" and sends it to the character buffer. The highlighting disappears from the display.

Figure 8:
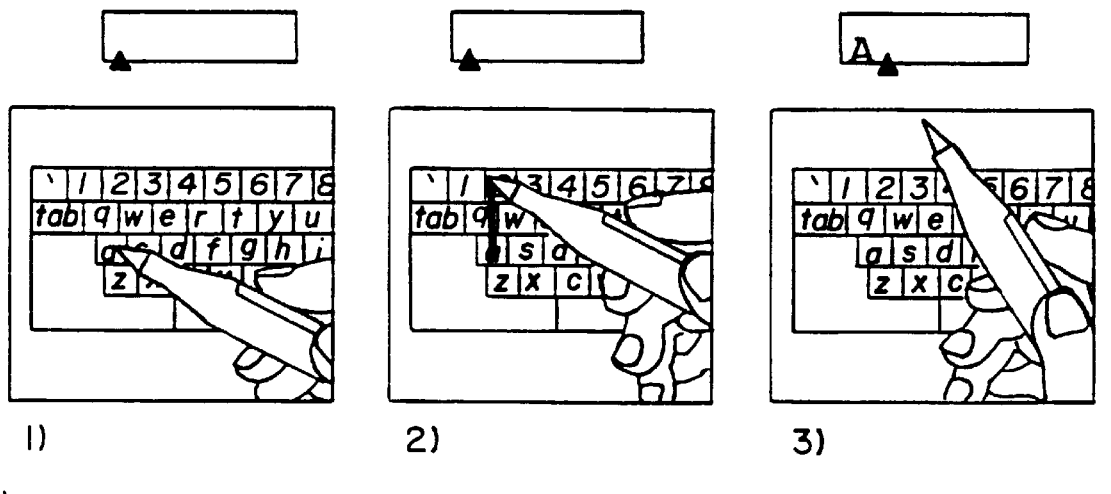
FIG. 8 is a series of views in which a user enters an uppercase character by making an upward stroke on a key of the graphical keyboard.

The series of three views of FIG. 8 shows a user entering an uppercase character using the graphical keyboard of the invention. The user does this by making an upward stroke or mark on the desired key of the graphical keyboard.

In the first view of FIG. 8, the user places the pen or stylus on the key corresponding to the character to be entered (an "A" in this example). The key is highlighted in the display. The character buffer is empty.

In the second view of FIG. 8, the user moves the pen "upward"—that is, toward the topmost row of the keyboard—while continuing to hold the pen against the keyboard. The user maintains contact between the pen point and the surface of the screen on which the keyboard image is displayed substantially throughout the upward motion. This is called dragging the pen. The display shows a line or mark (an ink trail) where the user has dragged the pen. The character buffer remains empty at this stage, because the character to be entered has not yet been recognized. The key remains highlighted in the display.

In the third view of FIG. 8, the user removes the pen from the keyboard surface, completing the upward stroke. The line or mark disappears, as does the highlighting, and the character produced by the graphical keyboard in response to the upward stroke appears in the character buffer.

Figure 9:
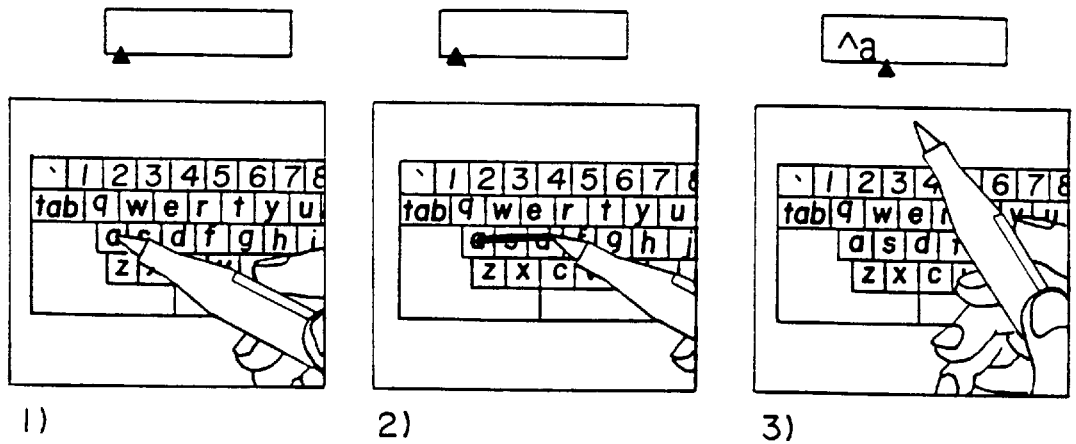
FIG. 9 is a series of views in which a user enters a control character by making a rightward stroke on a key of the graphical keyboard.

The series of three views of FIG. 9 shows a user entering a control character using the graphical keyboard of the invention. A "control character" is produced on a conventional, mechanical keyboard by holding down the modifier key marked "control" or "ctrl" while pressing a character key. Pressing the "ctrl" key while striking the key for the letter "a," for example, produces the character called "control-a," which can also be written as "ctrl-a" or "^a." On the graphical keyboard of the invention, the user can enter a control character by making a rightward stroke or mark on the desired key of the graphical keyboard.

In the first view of FIG. 9, the user places the pen or stylus on the key corresponding to the character to be entered (the key "a" corresponding to the character "^a" in this example). The key is highlighted in display. The character buffer is empty.

In the second view of FIG. 9, the user drags the pen to the right: The user moves the pen to the right while continuing to hold the pen against the keyboard, and maintains contact between the pen point and the surface of the screen on which the keyboard image is displayed substantially throughout the rightward motion. The display shows a line or mark where the user has dragged the pen. The key remains highlighted. The character buffer remains empty at this stage, because the character to be entered has not yet been recognized.

In the third view of FIG. 9, the user removes the pen from the keyboard surface, completing the rightward stroke. The line or mark disappears, as does the highlighting of the key, and the character produced by the graphical keyboard in response to the rightward stroke appears in the character buffer.

Figure 10:
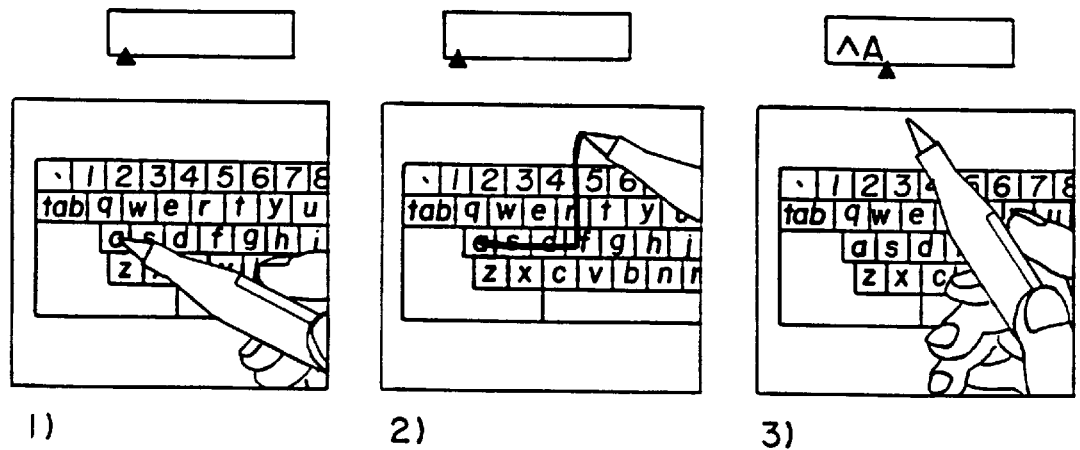
FIG. 10 is a series of views in which a user enters a control uppercase character by making a compound rightward-upward stroke on a key of the graphical keyboard.

FIG. 10 shows that modifiers can be combined by making compound strokes that combine strokes of different directions. The series of three views of FIG. 10 shows a user entering a control uppercase character using the graphical keyboard of the invention. A "control uppercase character" is produced on a conventional, mechanical keyboard by holding down the "shift" and "ctrl" modifier keys simultaneously while pressing a character key. Pressing the "shift" and "ctrl" keys while striking the key for the letter "a," for example, produces the character called "control-shift-a," which can also be written as "ctrl-A" or "^A." On the graphical keyboard of the invention, the user can enter a control uppercase character by making compound rightward-upward stroke or mark on the desired key of the graphical keyboard.

In the first view of FIG. 10, the user places the pen or stylus on the key corresponding to the character to be entered (the key "a" corresponding to the character "^A" in this example). The key is highlighted in the display. The character buffer is empty.

In the second view of FIG. 10, the user drags the pen a distance to the right and then a distance "upward"—that is, toward the topmost row of the keyboard. The user maintains contact between the pen point and the surface of the screen on which the keyboard image is displayed substantially throughout the rightward-and-then-upward motion. The display shows a line or mark where the user has dragged the pen. The key remains highlighted in the display. The character buffer remains empty at this stage, because the character to be entered has not yet been recognized.

In the third view of FIG. 10, the user removes the pen from the keyboard surface, completing the compound stroke. The line or mark disappears, as does the key highlighting, and the character produced by the graphical keyboard in response to the stroke appears in the character buffer.

Although the example of FIG. 10 shows the rightward portion of the compound stroke preceding the upward portion, the same "^A" character is produced if the upward portion of the stroke is performed before the rightward portion. Other kinds of modifiers can be combined by making compound marks in other directions. For example, if a leftward stroke indicates the "alt" modifier, then a leftward-upward or upward-leftward compound stroke combines the "alt" and "shift" (uppercase) modifiers, and a leftward-rightward or rightward-leftward compound stroke combines the "ctrl" and "alt" modifiers.

3. Marking Menus

An interaction technique known as marking menus is used to implement the presentation of and response to pen strokes in the graphical keyboard of the present invention in the specific embodiment to be described. This section presents a general description of the technique; section 4 describes the technique more specifically as it applies to the present invention. A complete description of the marking menus technique can be found in Gordon P. Kurtenbach, "The Design and Evaluation of Marking Menus," Ph. D. dissertation, Dept. of Computer Science, Univ. of Toronto, 1993, which is incorporated herein by reference as though set out in full.

3.1 Mark and Related Conceits

The marking menus technique is intended to support the novice user and expert user alike, and to provide an efficient mechanism to support the user's transition from novice to expert. In marking menus, as a user "writes" on the computer display surface with a pen or stylus the computer simulates the appearance of ink by leaving behind a trail (commonly referred to as an ink-trail) of pixels whose color or shade contrasts with that of the background pixels.

A mark is the series of pixels that are changed to the special "ink" color or shade when the pen is pressed and then moved across the display. The pixels that are changed to the ink color are those which lie directly under the tip of the pen as it is moved across the display. Free-hand drawings, ranging from meaningless scribbles to meaningful line drawings and symbols, including handwriting, are examples of marks. The act of drawing a mark is referred to as marking.

Marks can be created not only with a pen but also with other types of input devices. For example, a mouse can leave a trail of ink behind the tracking symbol when the mouse button is pressed and the mouse is dragged. Some systems use a pen and tablet. In this case, marks are made on the display by writing on the tablet instead of the display. Still other systems use a trackball.

Marking menus find application in pen-based computing systems and interfaces that can interpret as commands and parameters the various marks a user makes. (This is in contrast with systems in which a user's marks cannot be recognized by the system and serve strictly as annotations for the user's benefit.) Much of the literature on pen-based computing refers to marks as gestures. However, the term gesture is inappropriate in the context of marking menus.

Although it is true that creating a mark does involve a physical gesture, the thing that is interpreted by the system is the mark itself. For example, the "X" mark requires a completely different physical gesture if performed with a pen instead of a mouse. Gesture is an important aspect of marking because some marks may require awkward physical gestures with the input device. However, the two terms can be distinguished. The term mark is more appropriate for pen-based computer systems or applications that emulate paper and pen, and will be used hereinbelow.

3.2 Why Use Marks?

Conventional human-computer interfaces are asymmetric in terms of input and output capabilities. There are number of computer output modes: visual, audio and tactile. Most computers extensively utilize the visual mode; high-resolution images that use thousands of colors of can be displayed quickly and in meaningful ways to a user. In contrast, a computer's ability to sense user input is limited. Humans have a wide range of communication skills such as speech and touch, but most computers sense only a small subset of these. For example, keyboards only sense finger presses (but not pressure) and mice only sense very simple arm or wrist movements. Therefore, the advent of the pen as a computer input device provides the opportunity to increase input bandwidth through the use of marks.

A major motivation for using marks is the inadequacy of mouse and keyboard interfaces. This is exemplified by applications that are controlled through button presses and position information. (The term buttons is used here as a generic way of describing menus items, dialog box items, icons, keys on a keyboard, etc., which are typical of direct manipulation interfaces.) Expert users of these types of systems find the interfaces inadequate because button interfaces are inefficient. The existence of interaction techniques that override buttons for the sake of efficiency is evidence of this. Experts, having great familiarity with the interface, are aware of the set of available commands. They no longer need menus to remind them of available commands, and they find that invoking commands through menu displays becomes very tedious.

Designers have addressed this problem in several ways. One solution is accelerator keys which allow experts direct access to commands. An accelerator key is a key on the keyboard which, when pressed, immediately executes a function associated with a menu item or button. The intention is that using an accelerator key saves the expert user the time required to display and select a menu item or button. Many systems display the names of accelerator keys next to menu items or buttons to help users learn and recall the associations between accelerator keys and functions.

Accelerator keys have their problems. Arbitrary mappings between accelerator keys and functions can be hard to learn and remember. Sometimes mnemonics can be established between accelerator key and function (e.g., control-o for "open", but mnemonics quickly run out as the number of accelerator keys increases. Further confusion can be caused by different applications using a common key for different functions or by different applications using different accelerator keys for a common function. Experts must then remember arbitrary or complex mappings between keys and functions depending on application.

Another way of supporting the expert user is by supplying a command-line interface in addition to a direct manipulation interface. However, command-line interfaces also have problems, notably because they are radically different from direct manipulation interfaces. To become an expert, a novice must learn another entirely different interface.

Marks overcome the problems of accelerator key and command-line interface solutions. Marks, because of their symbolic nature, can make functions more immediately accessible. Rather than triggering a function by a button press, a mark can signal a command. For example, a symbolic mark can be associated with a function and a user can invoke the function by drawing the symbol. In theory, because marks can be used to draw any symbol or series of symbols, marks can provide a quicker method of choosing a command than searching for a physical or graphical button and pressing it. In practice, the number of marks is limited by the system's ability to recognize symbols and a human's ability to remember the set of symbols. Nevertheless, even if only a small set of marks are used, a user can invoke the associated functions immediately.

Marks can also be used to hide functions. Functions that are not provided by means of buttons can nonetheless be provided by marks. This makes a full-functioned interface possible with a smaller number of buttons, which in turn means a more efficient use of available display area. In many cases, moreover, a mark can be much more effective than a button for invoking a function.

An additional motivation for using marks is that there are some intrinsic qualities that marks have which can provide a more "natural" way to express otherwise difficult or awkward concepts (such as spatial or temporal information). In particular, marks provide a straightforward way to embed multiple command attributes into a single mark.

3.3 Marking Menus and Related Concepts

A marking menu is an interaction technique that allows a user to select from a menu of items. There are two ways, or modes, in which a selection can be performed:

(1) Menu mode. In this mode a user makes a selection by displaying a menu. A user enters this mode by pressing the pen against the display and waiting for a short time interval, for example, approximately ⅓ of a second. This action is sometimes referred to as press-and-wait. A radial menu (or pie menu) of items is then displayed centered around the pen tip. A radial menu is a menu wherein the menu items are positioned in a circle surrounding the cursor and each item is associated with a certain sector of the circle. A user can select a menu item by moving the pen tip into the sector of the desired item. The selected item is highlighted and the selection is confirmed when the pen is lifted from the display. At the center of the radial menu is a center circle, typically, a circle of about 1 cm in diameter, highlighted or otherwise visually indicated. The pen can be moved within the center circle without causing a menu selection.

(2) Mark mode. In this mode, a user makes a selection by drawing a mark. A user enters this mode by pressing the pen against the display and immediately moving in the direction of the desired menu item. Rather than displaying a menu, the system draws an ink-trail following the pen tip. When the pen is lifted, the item that corresponds to the direction of movement is selected.

Figure 11:
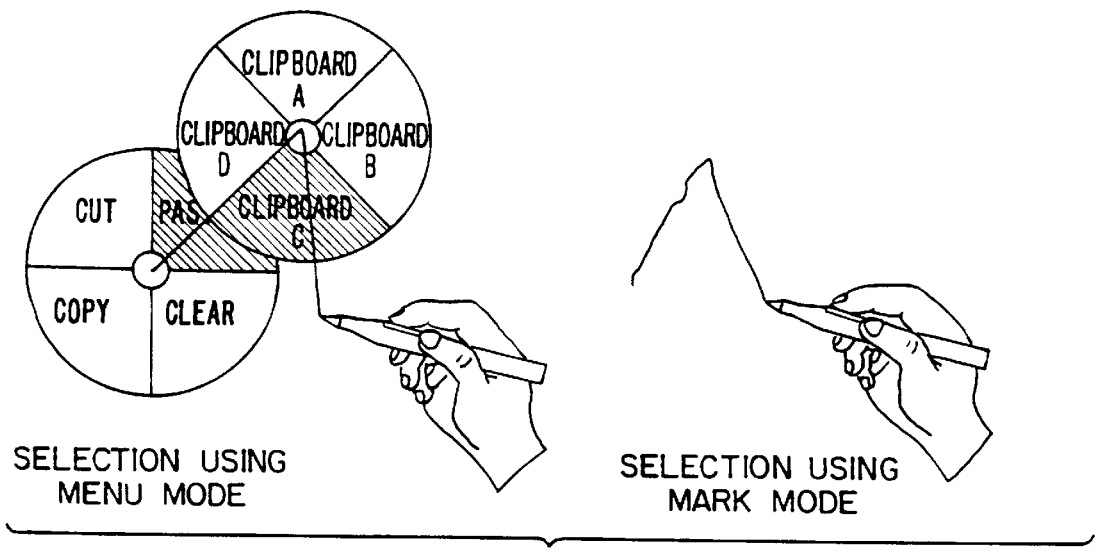
FIG. 11 depicts the two modes of selecting from a marking menu.

FIG. 11 depicts two views that illustrate, respectively, the two modes of selecting a command from a marking menu. The first view at the left of FIG. 11 shows a user selecting a menu choice in menu mode. In this example, two menus are presented in succession to the user. The user chooses the "paste" menu choice by dragging the pen into the upper right-hand quadrant of the first menu, and then, without lifting the pen off the screen, chooses the "clipboard c" menu choice by dragging the pen into the bottom quadrant of the second menu. The effect of this series of choices is to cause data to be pasted (inserted into a working document) from a clipboard (storage buffer) called Clipboard C. Although the first and second menus are shown for clarity of exposition as appearing simultaneously on the display screen in FIG. 11, in some embodiments—and in particular, in the embodiments of the graphical keyboard of the invention described herein—the first menu disappears when the second menu appears, so that the user is presented with only one menu at a time.

The second view at the right of FIG. 11 shows a user selecting the same menu choice as in the first view, but this time doing so in mark mode. The user makes substantially the same pen motions and thus the substantially same mark (a diagonal upward-rightward line segment followed by a downward line segment) as in the first view, but the radial menus do not appear. The effect of this series of choices is once again to cause data to be pasted from a clipboard called Clipboard C. The second view of FIG. 11 illustrates an important concept of marking menus: The physical movement required to select an item using a mark in mark mode mimics the physical movement involved in selecting an item in menu mode.

Marking menus can be hierarchical. In menu mode, if a menu item has a subitem associated with it, rather than lifting the pen to select the item, the user waits with the pen pressed down to trigger the display of the submenu. The submenu is also a radial menu. The user can then select an item from a submenu in the manner previously described. In mark mode, a user makes a selection by drawing a mark where changes in direction correspond to selections from submenus. The example of FIG. 11 is an example of selecting from hierarchical menus using menu mode and mark mode. The first menu is at the top of the hierarchy; the second menu is a submenu of the first and is beneath the first in the hierarchy.

Figure 12:
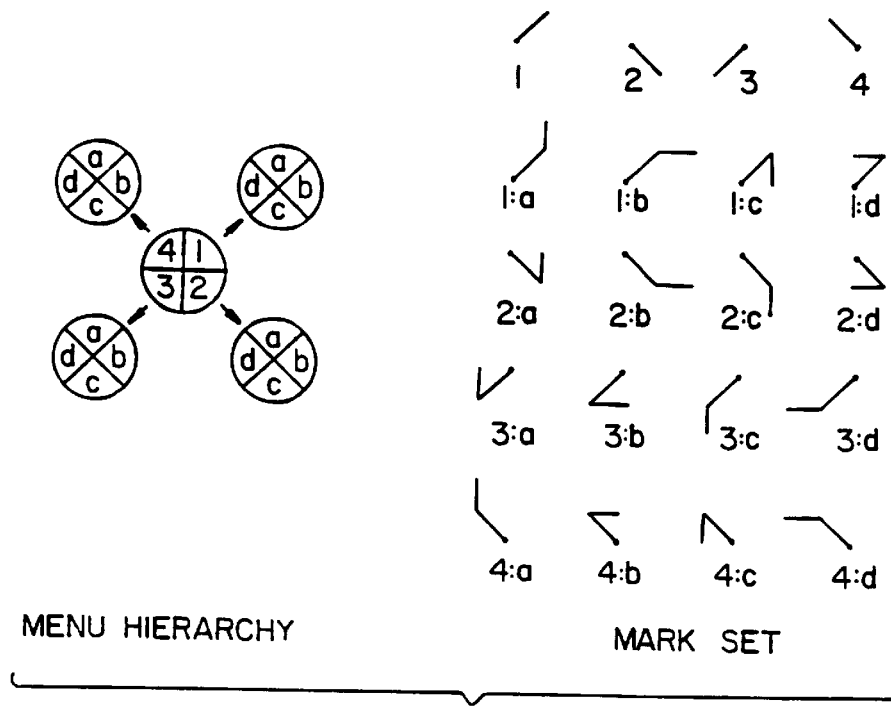
FIG. 12 is example of a radial menu hierarchy and the marks that select from it.

Using radial menus in this way produces a set of mark which consist of a series of line segments at various angles ("zig-zag" marks). Marking menus which have no hierarchic items produce strictly straight line segments. FIG. 12 shows an example of a menu hierarchy and its associated set of marks. The left-hand view of FIG. 12 shows the menu hierarchy. The top-level menu in FIG. 12 is a numeric menu containing the four menu choices 1, 2, 3, and 4. Each of these choices has associated with it an alphabetic submenu consisting of the choices a, b, c, and d. The right-hand view of FIG. 12 shows the mark set. A mark's label indicates the menu items it selects. A dot indicates the starting point of a mark.

Figure 13:
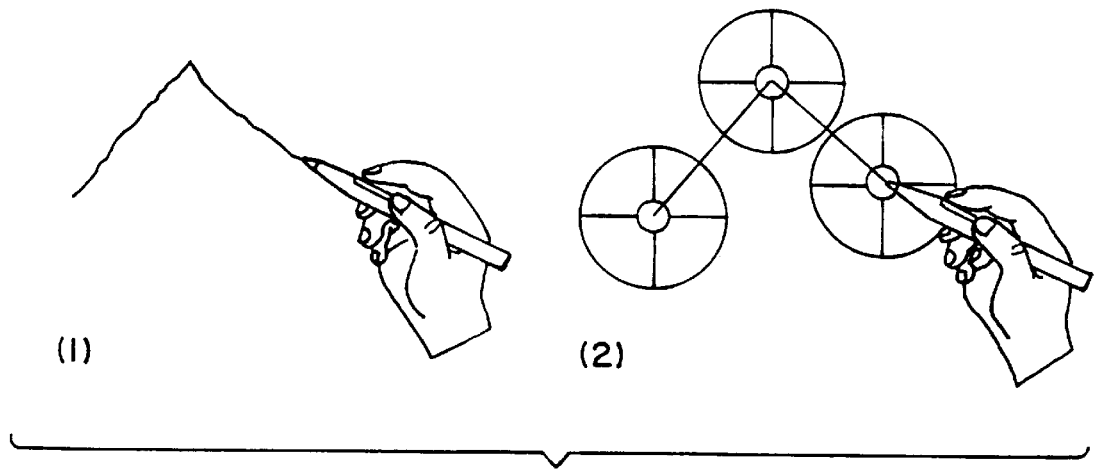
FIG. 13 is an example of mark confirmation.

It is also possible to verify the items associated with a mark or a portion of a mark. This is sometimes referred to as mark confirmation. In this case a user draws a mark but presses-and-waits at the end of drawing the mark. The system then displays radial menus along the mark "as if" the selection were being performed in menu mode. FIG. 13 shows an example of this in a menu with three levels of hierarchy. In the left-hand view of FIG. 13, the user draws the first part of the mark, then waits with the pen pressed down for the system to recognize the selection so far. In the right-hand view of FIG. 13, the system then displays its interpretation of the mark, and goes into menu mode for the completion of the selection.

Other types of behavior can occur when selecting from a marking menu, such as backing-up in a menu hierarchy or reselecting an item in menu mode.

3.4 Summary

The following is a summary of the design features that make marking menus a valuable and unique interaction technique. Marking menus:

Allow menu selection acceleration without a keyboard.

Permit acceleration on all menu items.

Minimize the difference between the menu selection and accelerated selection.

Permit pointing and menu selection acceleration with the same input device.

Utilize marks that are easy and fast to draw.

Use a spatial method for learning and remembering the association between menu items and marks.

Are implementable as a "plug-in" software module.

With conventional menus, the user moves a cursor (e.g., using a mouse) to a particular absolute or relative screen location in order to select an item from the menu. With marking menus, it is the direction of motion rather than the particular location moved to that causes menu selection. For example, moving the cursor upwards on the screen can select a first menu item; down, a second; right, a third; left, a fourth. Additional selections can be associated with diagonal cursor motions. Marking menus are arranged radially (as "pie menus"rather than linearly, so that each direction of motion is associated with a unique menu selection. The geometrical nature of marking menus makes them easy for users to memorize. A user learns and remembers spatial pathways through the menus. Such pathways can be easier to remember than combinations of accelerator keys that are conventionally used to substitute for menu selections. Whereas a sequence of accelerator keys corresponding to a sequence of selections from multiple levels of hierarchical menus can be somewhat arbitrary, the path traced by the pen in skipping over intermediate marking menus is the same that is used to select them when the menus are displayed. In short, marking menus show the menus to the novice user, and leave the expert user just making the marks.

4. Marking Menus in the Present Invention

As applied in the present invention, the marking menus technique makes menus available to assist the user who has not memorized the pen strokes, and hides menus from the user who does not require them. At any time, the user can activate a radial pop-up menu which shows the available choices by holding the pen down without moving it laterally. The user can then make the desired selection by moving the pen (that is, the point or tip of the pen, which is in contact with the input-sensing display screen or input tablet) into the "slice" of the pie occupied by the desired menu choice. Simply raising the pen off the display screen without lateral movement causes the menu to disappear and no selection to be made.

Figure 14:
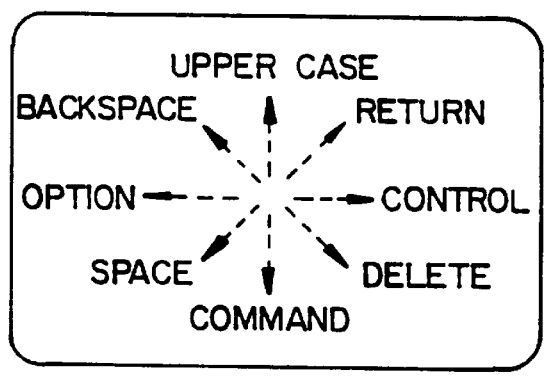
FIG. 14 schematically depicts a pop-up menu revealing a stroke vocabulary of eight stroke directions.

FIGS. 14–17 depict illustrative examples of marking menus as applied in the context of the present invention. An example of a radial or pie menu corresponding to the eight strokes defined in the examples of FIGS. 4 and 6 is shown in FIG. 14. The directions of the strokes substantially correspond to the slices of the pie.

Figure 15:
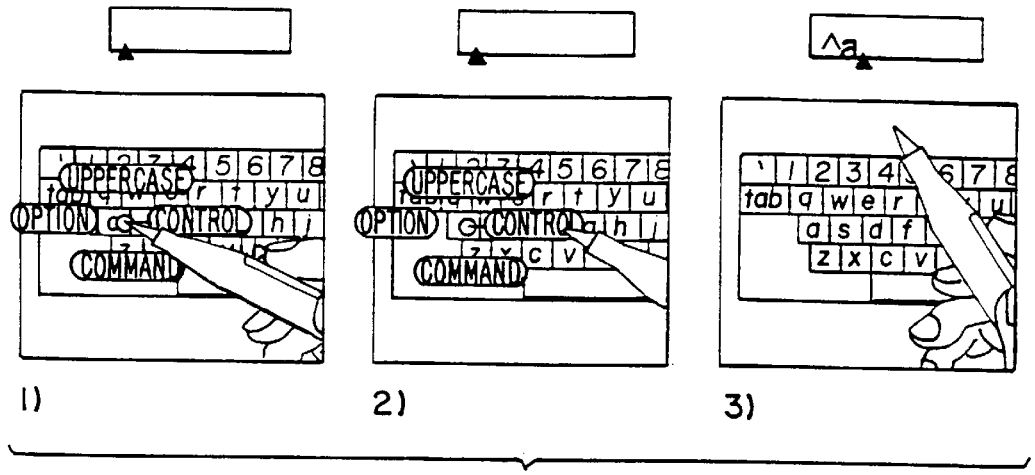
FIG. 15 is a series of views in which a user is presented with and selects from a marking menu.

FIG. 15 is a series of views in which a user enters a "^a" character using the graphical keyboard of the invention, with marking menus used in menu mode.

In the first view of FIG. 15, the user presses and holds the pen on the "a" key of the graphical keyboard. More precisely, the user presses and holds the pen against the display screen at the location of the "a" key of the keyboard image of the graphical keyboard. The key is highlighted in the display. Thereafter, a radial menu showing four choices of modifier—"uppercase," "option," "control," and "command"—appears on the screen, overlaid on the keyboard image and approximately centered around the location of the tip of the pen. Other modifiers or other menu choices can be provided in alternative embodiments. Also, at this point, the user can simply lift the pen off the screen to cancel the menu display, in which case no character is generated by the graphical keyboard.

In the second view of FIG. 15, the user moves the pen to the right, maintaining the pen in contact with the screen, to select the "control" modifier. The radial menu remains displayed. The key remains highlighted.

In the third view of FIG. 15, the user lifts the pen point off the screen. This causes the "control" modifier to be applied to the "a" key, so that the graphical keyboard generates the "^a" character. The radial menu disappears, as does the key highlighting, leaving the keyboard image as it originally appeared.

Figure 16:
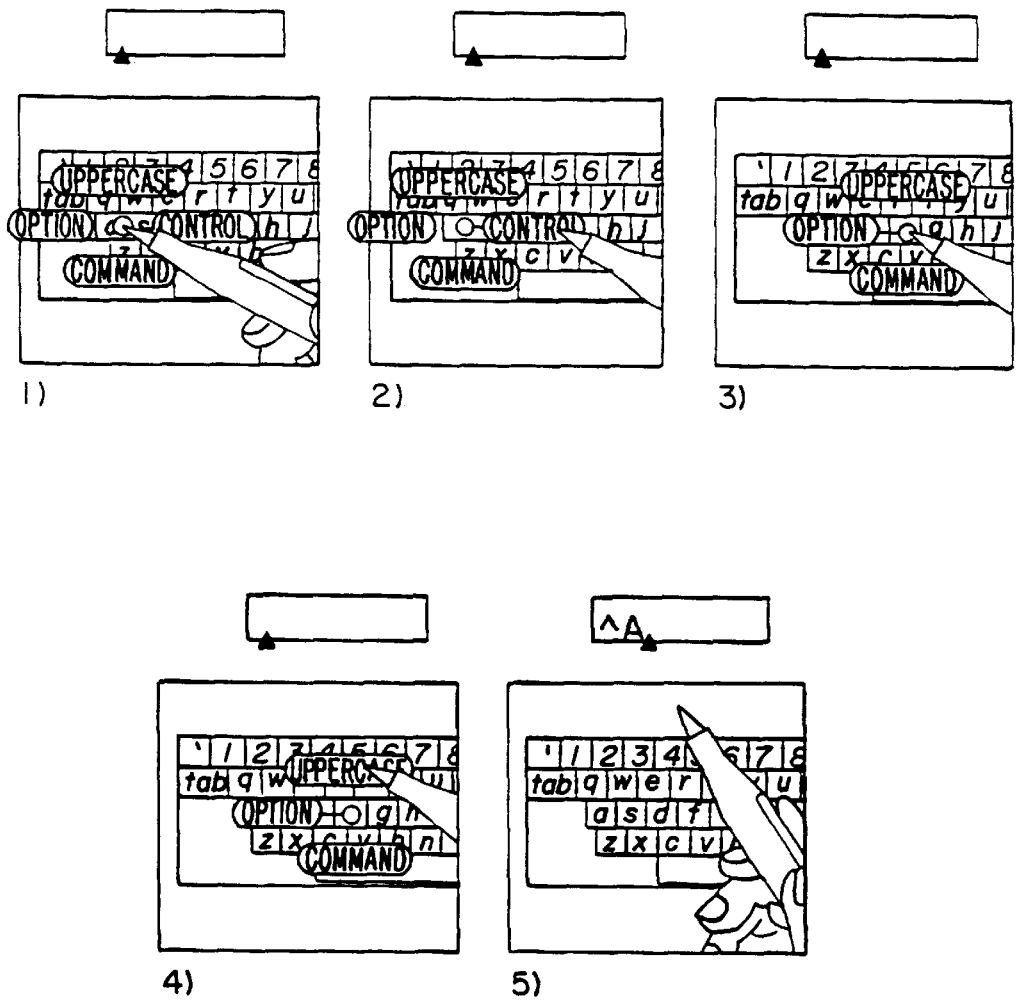
FIG. 16 is a series of views showing an example of marking menus used to combine modifiers in the context of the present invention.

FIG. 16 is a series of views in which a user enters a "^A" character using the graphical keyboard of the invention, with marking menus used in menu mode.

In the first view of FIG. 16, the user presses and holds the pen on the "a" key of the graphical keyboard. More precisely, the user presses and holds the pen against the display screen at the location of the "a" key of keyboard image of the graphical keyboard. Thereafter, a radial menu showing four choices of modifier—"uppercase," "option," "control," and "command"—appears on the screen, overlaid on the keyboard image and approximately centered around the location of the tip of the pen.

In the second view of FIG. 16, the user moves the pen to the right, maintaining the pen in contact with the screen, to select the "control" modifier. The selected menu choice (the "control" modifier) is highlighted. The radial menu remains displayed and the key remains highlighted.

In the third view of FIG. 16, the user holds the pen still, maintaining the pen at the location previously reached upon selection of the "control" modifier. Thereafter, the first menu of four choices disappears and is replaced by a second radial menu which shows the remaining available choices of modifier available to be applied to this character— "uppercase," "option," and "command." This second menu appears on the screen overlaid on the keyboard image and approximately centered around the location of the tip of the pen. The key remains highlighted, although it is partially obscured by the menu in this example.

In the fourth view of FIG. 16, the user moves the pen upwards, that is, toward the top of the screen display, to select the "uppercase" modifier. The selected menu choice is highlighted. The radial menu remains displayed, and the key remains highlighted.

In the fifth view of FIG. 16, the user lifts the pen off the screen. This causes the "control" and "uppercase" modifiers to be applied to the "a" key, so that the graphical keyboard generates the "^A" character. The radial menu disappears, as does the key highlighting, leaving the keyboard image as it originally appeared.

Menus can be nested to levels deeper than the two levels shown in FIG. 16. For example, three levels of modifier can be applied to a character, to generate characters such as "command-option-A" or "control-alt-X" using the graphical keyboard.

Figure 17:
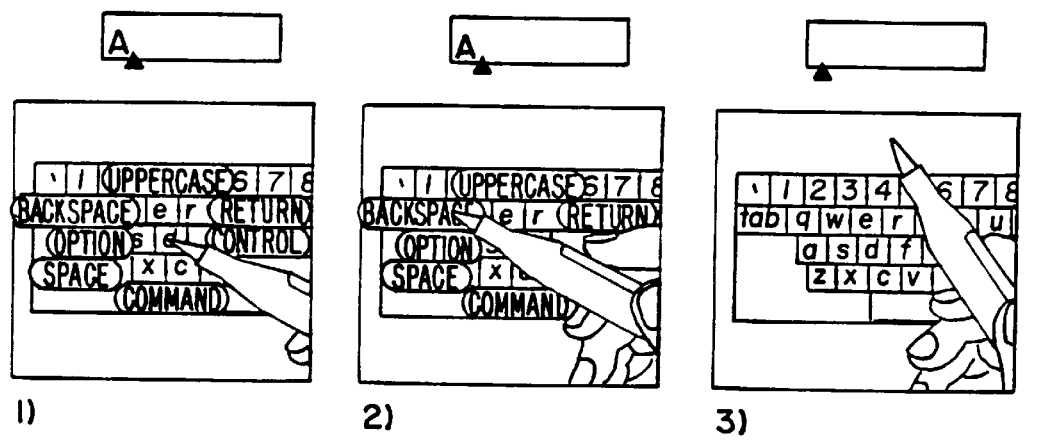
FIG. 17 is a series of views showing how an eight-way marking menu can be used with the graphical keyboard of the invention.

FIG. 17 is a series of views showing an example of selection from an 8-item marking menu in an embodiment of the present invention. The eight menu selections include "uppercase" (shift), "option," "ctrl" "command," "backspace," "space," "return," and "delete."

In the first view of FIG. 17, the character buffer contains a character, "A," that the user wants to delete. This unwanted character is immediately behind the cursor position, which is represented by the small triangle. The user presses and holds the pen against the display screen at the location of a key (here, "d"of the keyboard image of the graphical keyboard. The key is highlighted in the display. Thereafter, a radial menu showing eight selections, including four choices of modifier—"uppercase," "option," "control," and "command"—and four choices of special characters—"backspace," "space," "return," and (not visible in FIG. 17) "delete"—appears on the screen, overlaid on the keyboard image and approximately centered around the location of the tip of the pen. At this point, the user can simply lift the pen off the screen to cancel the menu display, in which case no character is generated by the graphical keyboard.

In the second view of FIG. 17, the user moves the pen diagonally upward and to the left, in the direction of the "backspace" item of the radial menu, while maintaining the pen in contact with the screen. This selects the "backspace" character. The radial menu remains displayed. The key remains highlighted.

In the third view of FIG. 17, the user lifts the pen point off the screen. This causes the graphical keyboard to generate the "backspace" character, which in this embodiment causes the unwanted character in the buffer to be erased and the cursor position to be moved to the left. (In other embodiments, the "backspace" character, or an equivalent such as "^h," is placed in the buffer, and it is left to an applications program receiving input from the graphical keyboard to interpret this as an erasure.) The highlighted key of the keyboard is ignored. The radial menu disappears, as does the key highlighting, leaving the keyboard image as it originally appeared.

Additional examples of marking menus as used in the present invention were seen in FIGS. 7–10. However, unlike the marking menus illustrated in FIGS. 15–17, the marking menus of FIGS. 7–10 are in mark mode, so that no radial menus appear.

In some embodiments of the invention, marking menus are optional. The menus can be optionally disabled by the expert user, so that marks can be used without menus. In some embodiments, the marks can even be invisible, as though drawn in invisible ink. The path of the pen point (or mouse cursor or other input device representation) as drawn by the user is interpreted by the graphical keyboard as though a mark had been drawn, but no ink trail appears on the screen.

5. System Components

Figure 18:
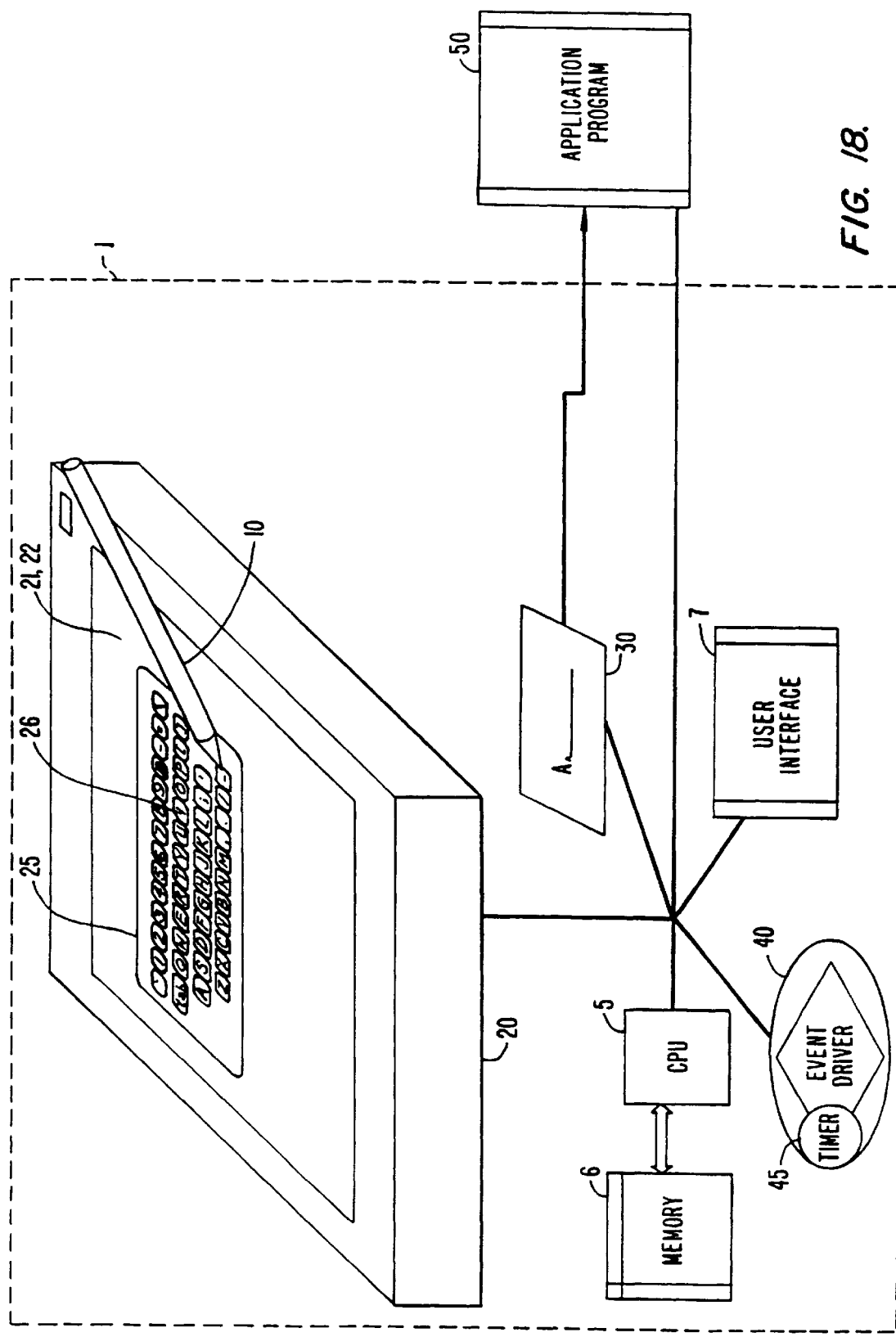
FIG. 18 illustrates a pen-based system suitable for implementing the invention.

FIG. 18 illustrates a system 1 suitable for implementation of the graphical keyboard of the present invention. System 1 includes a processor 5, memory 6 coupled to processor 5, user interface software 7 executed by processor 5, a pen 10, an input-sensing display device 20 that includes an input sensor 21 closely coupled to a display screen 22, a character buffer 30, and an event driver 40 that incorporates a delay timer 45. Screen 22 displays a keyboard image 25 including a plurality of keys 26. Sensor 21, screen 22, buffer 30, and event driver 40 are operationally connected to processor 5 and are accessible to user interface software 7. System 1 typically further includes operating software (not shown) executed by processor 5 and hardware (not shown) for interconnecting various components of system 1. Application program 50, which is not part of system 1, accepts characters supplied by system 1 (that is, by the graphical keyboard) via buffer 30.

In use, system 1 receives input in the form of taps and strokes from pen 10 applied to input sensor 21. Processor 5, carrying out instructions according to user interface software 7, determines the significance of the pen strokes, and in particular the characters to which the pen taps and marks correspond. Processor 5 outputs a stream of the characters thus determined to buffer 30, and optionally outputs visual feedback, such as ink trails and pop-up menus, to screen 22. The characters stored in buffer 30 can then sent on for further processing by application program 50, which can be executed by processor 5 (as shown in FIG. 18) or by an additional processor or processors (not shown). Application program 50 optionally can echo the characters as part of its visual display, which can also appear in screen 22.

Certain elements of system 1 will now be more fully described. Processor 5 is a computer processing unit (CPU). Typically it is part of a mainframe, workstation, or personal computer. It can include multiple processing elements in some embodiments.

Pen 10 is used in conjunction with sensor 21 to provide input to the graphical keyboard. Pen 10 can be any instrument suitable for use with sensor 2. For example, if device 20 is a touch-sensitive display screen, pen 10 can be a simple stylus of plastic, metal, wood, or other material or materials. As another example, if device 20 is a light-sensitive screen, pen 10 can be a light pen. In some embodiments, an ordinary pen or pencil, a laser pointer, or even the user's finger can serve as pen 10.

Sensor 21 is used to detect whether pen 10 is in contact with device 20 and, if so, to determine the position of pen 10 with respect to device 20. That is, sensor 21 is used to determine whether pen 10 is "up" or "down" and where pen 10 is with respect to display screen 22 and in particular with respect to keyboard image 25. Sensor 21 substantially overlays (or, in some embodiments, underlays) screen 22 so that the position of pen 10 relative to sensor 21 coincides with the position of pen 10 relative to screen 22.

The marking menus technique described above presupposes that pen 10 affects the display shown by screen 22 in a manner analogous to the way an ordinary ball-point or fountain pen affects paper. That is, pen 10 leaves an ink trail on screen 22. Thus when a user makes a stroke or a combination of strokes with pen 10 on input sensor 21, for example, a stroke that proceeds leftward and then upward, a corresponding mark appears on the screen, for example, an L-shaped mark.

Keyboard image 25 is a graphical image generated by processor 5 in accordance with user interface software 7 and displayed on screen 22. Keyboard image 25 is shown in FIG. 18 as including keys 26 in a standard QWERTY keyboard layout. Other kinds of keyboards and layouts can be used within the scope of the invention; for example, keyboard image 25 can include function keys, or can be the image of a nonstandard keyboard layout such as a Dvorak keyboard. In some embodiments, keyboard image 25 can be the image of a numeric keypad or a musical keyboard.

Keyboard image 25 as shown in FIG. 18 does not include modifier keys such as "shift," "ctrl," "alt," or "command." According to the invention, these keys are unnecessary; their functionality is replaced in this embodiment by appropriate pen strokes. Thus keyboard image 25 occupies a smaller area of screen 20 than would be the case were the additional keys present.

Buffer 30 stores characters that are generated by the graphical keyboard in response to user input. Typically, these characters are accepted as input by an application program such as application program 50. Screen 22 optionally can display ("echo") the characters that are stored in buffer 30 or the characters that application program 50 receives. Buffer 30 can be implemented using memory 6. It is accessible by both user interface software 7 and application program 50.

Event driver 40 is connected to processor 5, input sensor 21, and delay timer 45, and is accessible by user interface software 7. Typically, event driver 40 and delay timer 45 are implemented in operating system software that is executed by processor 5. They can also be implemented in hardware or partially in hardware in some embodiments.

5.1 Event-driven Architecture

Event driver 40 is used to inform the graphical keyboard about certain events, or changes of state, associated with pen 10. Specifically, event driver 40 can generate the following events:

PenDown—This event is generated when pen 10 is pressed down, that is, when pen 10 is newly brought into contact with sensor 21.

PenDrag—This event is generated when pen 10 is kept pressed down and the location of pen 10 changes. A PenDrag event is generated every time the pen moves an appreciable amount, e.g. one pixel.

Penup—This event is generated when pen 10 is lifted up from (removed from contact with) sensor 21.

PenStill—This event is generated when pen 10 is kept pressed on sensor 21 and the location of pen 10 with respect to sensor 21 does not change a substantial amount (typically, 2 mm) for E seconds, where E is a delay time. E can be a fixed time value in some embodiments and can be adjusted by the user in other embodiments. Typically, E is in the range of approximately 0.3 seconds to 1 second. Delay timer 45 is used to determine the length of time that pen 10 has been kept pressed down and held still. Timer 45 signals event driver 40 when the elapsed time reaches E seconds, which causes event driver 40 to generate a PenStill event. Timer 45 begins counting when pen 10 is pressed down or stops moving and is reset when pen 10 is lifted or begins moving.

The four kinds of events are used in various combinations to produce different behavior of the graphical keyboard of the invention. For example, suppose the user wants to enter a modified character, such as "^a." The user initiates the process of entering the character by pressing the pen down on a key of the graphical keyboard, which causes event driver 40 to generate a PenDown event. The user then makes a mark by dragging the pen while holding it down. In the process of doing so, the user causes event driver 40 to generate numerous PenDrag events. Optionally, the user can pause during the marking to prompt the system for a menu (either a top-level menu or a submenu) to be displayed. This causes event driver 40 to generate a PenStill event. Finally, to complete the mark, the user lifts the pen away from the screen or input sensor, which causes event driver 40 to generate a PenUp event. Thereafter, the user's mark is processed by processor 5 according to the basic character determined by the pen location at the time of the PenDown event and the modifier(s) determined by the mark. This typically causes the desired character to be output to character buffer 30.

5.2 Software Environment

As will be appreciated by persons skilled in the art, the graphical keyboard of the present invention is typically used as part of a graphical user interface in the context of an operating system or environment. This environment is supported by software that is executed by processor 5. Typically, the environment supports windowing operations such as associating a window with keyboard image 25, displaying this window at a location on screen 22, determining whether events associated with pen 10 pertain to this window and therefore to the graphical keyboard, directing position information from pen 10 to this window and thence to the graphical keyboard, and directing the output of character buffer 30 to an application program such as application program 50.

Typically, the software environment operates in conjunction with event driver 40 to feed to the graphical keyboard all and only those events relevant to operation of the graphical keyboard. Events that have to do with other windows or processes are directed to those other windows or processes. In such embodiments the graphical keyboard need not incorporate logic to discriminate between events that are relevant to its operation and events that are not. It is assumed here (in particular, in section 6 below) that the events processed by the graphical keyboard of the invention are relevant events.

Other kinds of software environments, including nonwindowing environments, are contemplated within the scope of the invention. For example, the graphical keyboard of the invention can be implemented in a pen-based computer system that presents the user interface through the metaphor of a continuous sheet or roll of paper rather than that of a collection of discrete windows.

5.3 Alternatives to Input-Sensing Screens

In the embodiment of FIG. 18, input sensor 21 is closely coupled to screen 22 in input-sensing display device 20. This makes the relative positions of pen 10 and the keys 26 of keyboard image 25 immediately apparent to the user. Such an arrangement, in which the user effectively writes on the display, can be termed a direct interface. The invention can also be adapted for use with an indirect interface, in which the pen or other writing instrument does not contact the display. Some examples of such embodiments will now be given.

Figure 19:
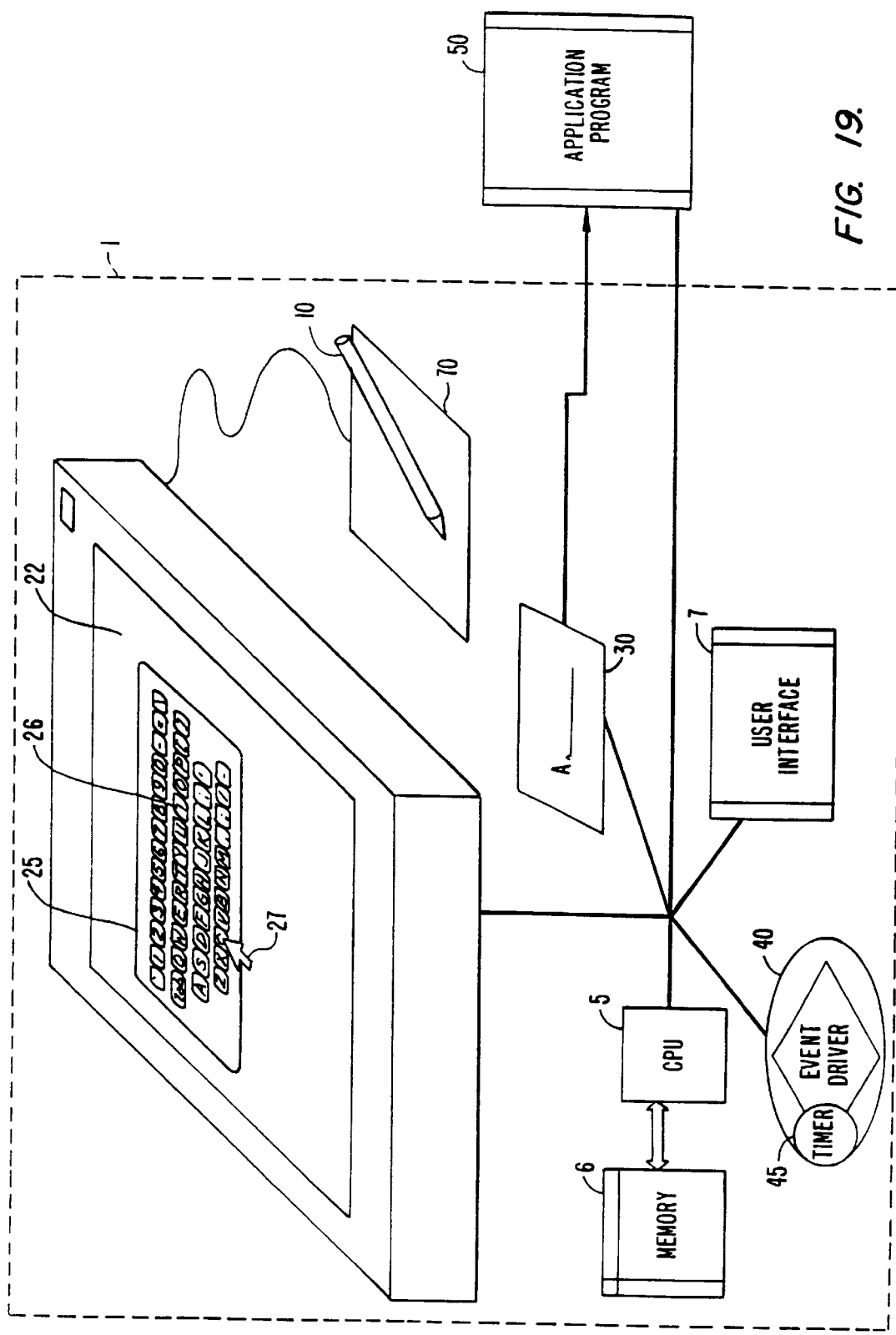
FIG. 19 illustrates an alternative pen-based system in which the display screen and input sensor are decoupled.

In the alternative embodiment shown in FIG. 19, sensor 21 and screen 22 are decoupled, so that a conventional, non-input-sensing display can be used. A digitizing tablet 70 is used to detect input from pen 10, and the position of pen 10 on tablet 70 is represented by the position of an indicator such as cursor 27 in screen 22. The user can determine the relative position of pen 10 with respect to keys 26 of keyboard image 25 by inspecting the position of cursor 27.

Figure 20:
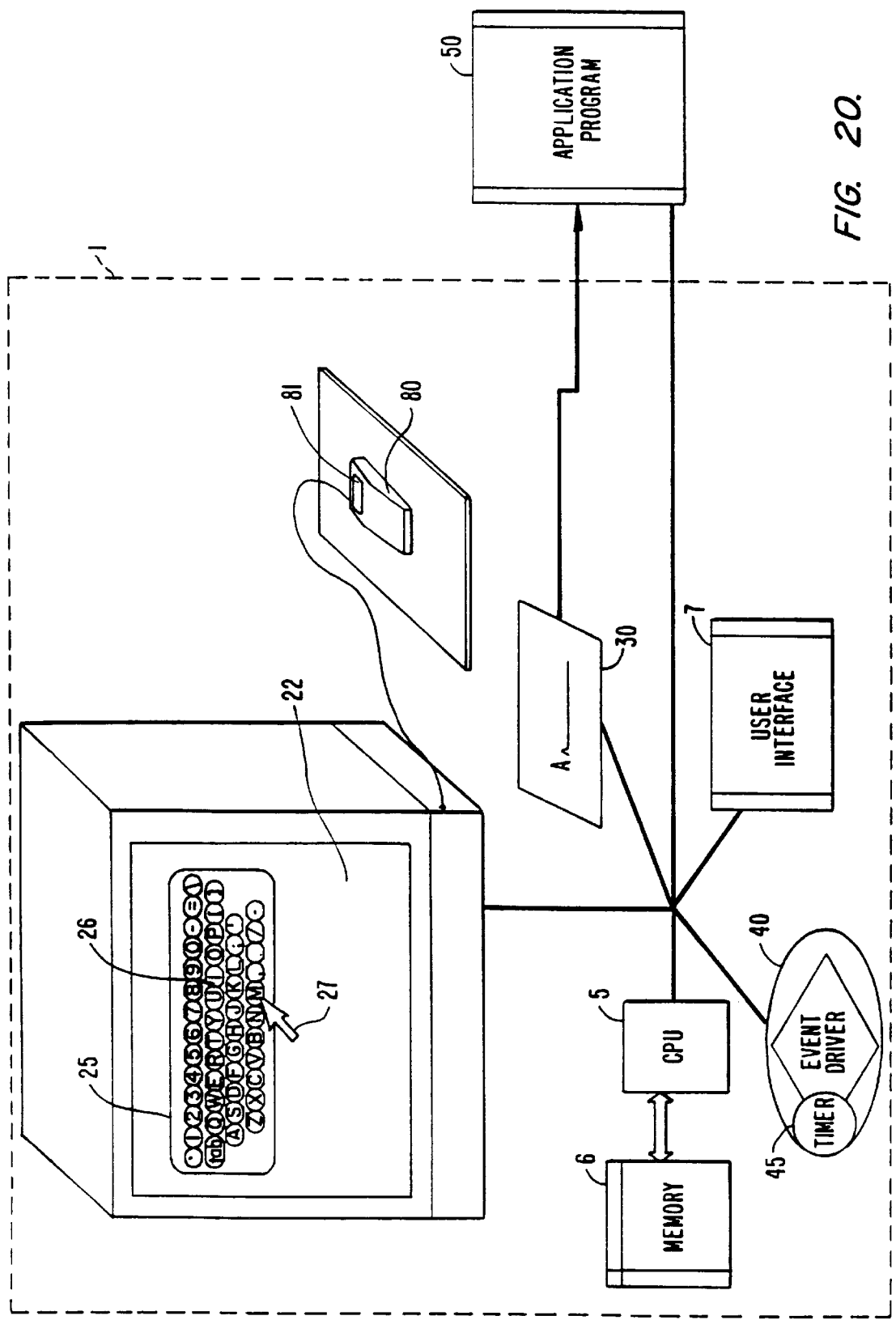
FIG. 20 illustrates a mouse-based system suitable for implementing the invention.

In yet another alternative embodiment, as shown in FIG. 20, a mouse 80 (or other equivalent input device) takes the place of both pen 10 and sensor 21. The mouse position is sensed by appropriate software that is part of user interface software 7 executed by processor 5. The status of mouse button 81 can be used to determine whether mouse 80 is active; this is analogous to using sensor 21 to determine whether pen 10 is down or up. Cursor 27 provides visual feedback about the relative positions of mouse 80 and keys 26 of keyboard image 25. Persons skilled in the art will appreciate that a broad range of equivalent input devices sensing two or more dimensions, including but not limited to trackballs and joysticks, can be used in place of mouse 80.

Figure 19A:
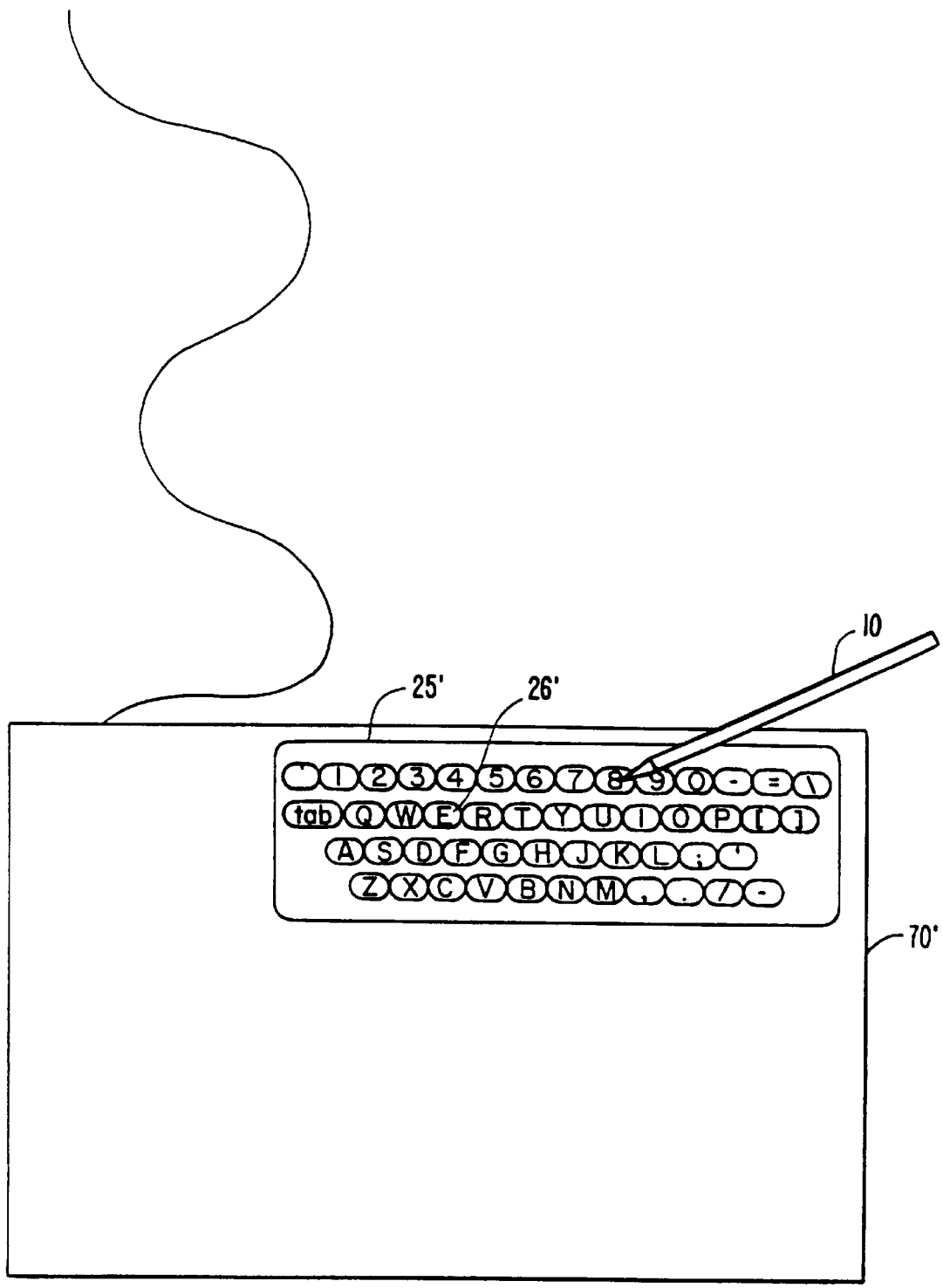
FIG. 19A illustrates an input sensor with an affixed keyboard image.

In some embodiments, keyboard image 25 can be stenciled, glued, or otherwise affixed onto a writing surface in addition to or in lieu of being displayed on an electronic display screen. The writing surface can be, for example, digitizing tablet 70 of the embodiment of FIG. 19 or a mouse pad used in conjunction with mouse 80 of the embodiment of FIG. 20. FIG. 19A illustrates a digitizing tablet 70' to be used in place of digitizing tablet 70 in the embodiment of FIG. 19. Digitizing tablet 70' has stenciled on it a keyboard image 25' that includes keys 26'. The user can interact with the graphical keyboard by using pen 10 to make strokes across keys 26' of stenciled keyboard image 25'. Stenciled keyboard image 25' can have a counterpart graphical keyboard image 25 displayed on display screen 20, with the position of pen 10 being indicated by a cursor 27 and the pen stroke path indicated by an ink trail (not shown in FIG. 19). Alternatively, the on-screen visual cues (that is, cursor 27 and keyboard image 25 including keys 26) can be omitted in some embodiments, in which case stenciled keyboard image 25' replaces display 20 in communicating character information, position information, and the like to the user of the graphical keyboard of the invention. In still other embodiments, stenciled keyboard image 25' can be applied to a dedicated portion of an input-sensing display screen or can be applied to a suitably constructed membrane input sensor.

6. Method Steps

FIGS. 21–28 are flowcharts of the steps involved in processing input from the graphical keyboard of the invention in an embodiment that incorporates marking menus. These steps are carried out by system 1 under the control of processor 5, in response to PenDown, PenDrag, PenStill, and PenUp events generated by event driver 40.

6.1 Data Structures

The event handling routines that will be described share certain data structures in common. These data structures are typically stored in memory 6 and are accessible by processor 5. In one embodiment the data structures are of the following types:

(1) MM—represents a menu. An MM includes:
  a list of item names (e.g., shift, control, command, option)
  a list of submenus (represented as other MMs)
  a selected item, which is an index into the list of item names and list of submenus Before processing of a character starts (that is, before a new PenDown event occurs), a hierarchy of MMs exists which describes the hierarchy of menus that can be displayed. The MM hierarchy can be updated to reflect, in menu mode, the sequence of menus that has been displayed so far since the most recent PenDown event, or in mark mode, the sequence of menus that is selected by the current mark.

(2) Point—a tuple $(x,y,t,\phi)$:
  x—a horizontal screen location
  y—a vertical screen location
  t—the time x and y were recorded
  $\phi$—the angle formed by the preceding point, this point, and the next (3) PointList—an ordered list of Points. A mark is represented by a PointList that includes the screen (or input sensor) locations of the pen as the mark is being drawn. Each location has associated with it the time when it occurred (e.g., measured in milliseconds from the most recent PenDown event).

(4) ModeFlag—a toggle or flag that indicates whether the current mode for marking menus is menu mode or mark mode.

6.2 Event Handling Routines

Figure 21:
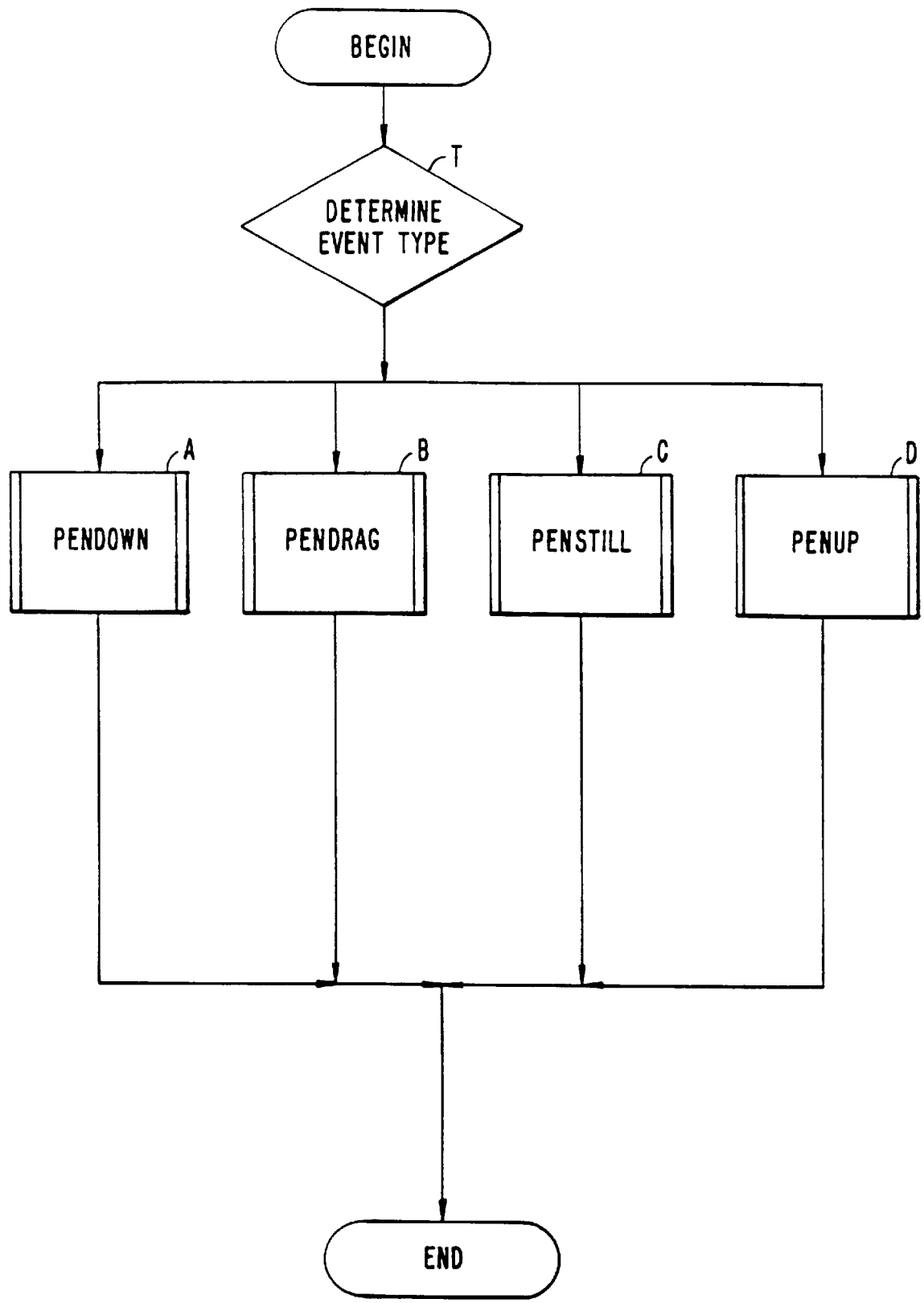
FIG. 21 is a flowchart of steps for responding to an event according to an embodiment of the invention that incorporates marking menus.

FIG. 21 shows the steps for responding to one of the four kinds of events generated by event driver 40: PenDown, PenDrag, PenStill, and PenUp. First the type of event that is to be handled is determined (Step T). According to the event type, one of four different event response routines is called: PenDown (Step A), PenDrag (Step B), PenStill (Step C), or PenUp (Step D). This completes processing until the next event occurs.

Figure 22:
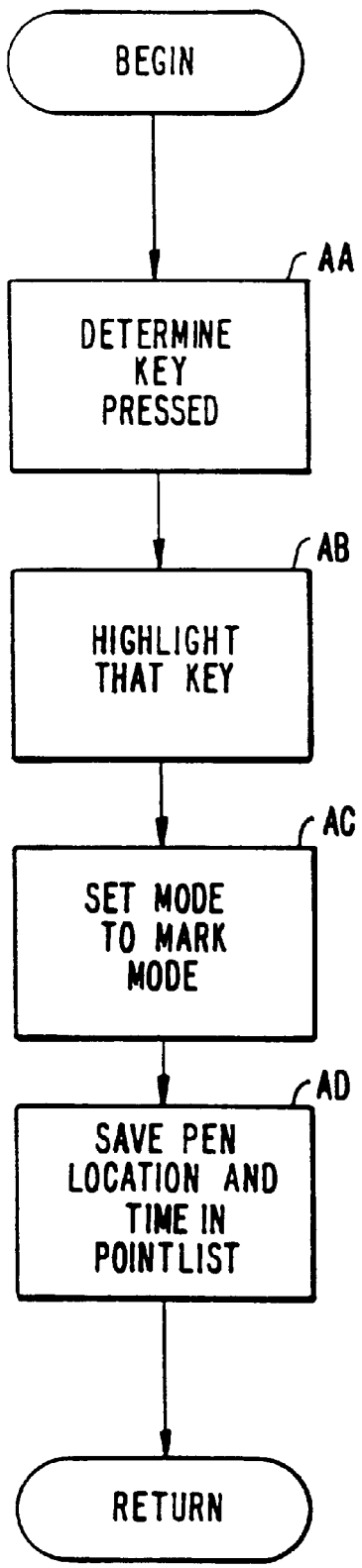
FIG. 22 is a flowchart of steps for processing a PenDown event.

(1) PenDown. If the event is a PenDown event (step A), the routine whose flowchart appears in FIG. 22 is executed. A determination is made of which key of the graphical keyboard is being pressed (Step AA). Typically, if an input-sensing display screen is used for input, the key being pressed is the key within whose borders the tip of the pen rests. If a mouse or a tablet separate from the screen is used for input, the key being pressed is the key whose position correlates most closely with the display position of the cursor 27 that represents the mouse or pen. Next, the key being pressed is highlighted in the display (Step AB). Typically this is done by darkening the appearance of its borders or by changing the color of its borders. Next, the mode is set to mark mode (Step AC). This is done by setting the ModeFlag to indicate mark mode. Finally, the pen location and the current time are saved as a Point in a PointList that is used to represent the mark currently being made (Step AD). The tuple of values of this Point indicates the location of pen 10 with respect to screen 22 (or the corresponding position of cursor 27 in embodiments that represent pen position as cursor position).

Figure 23:
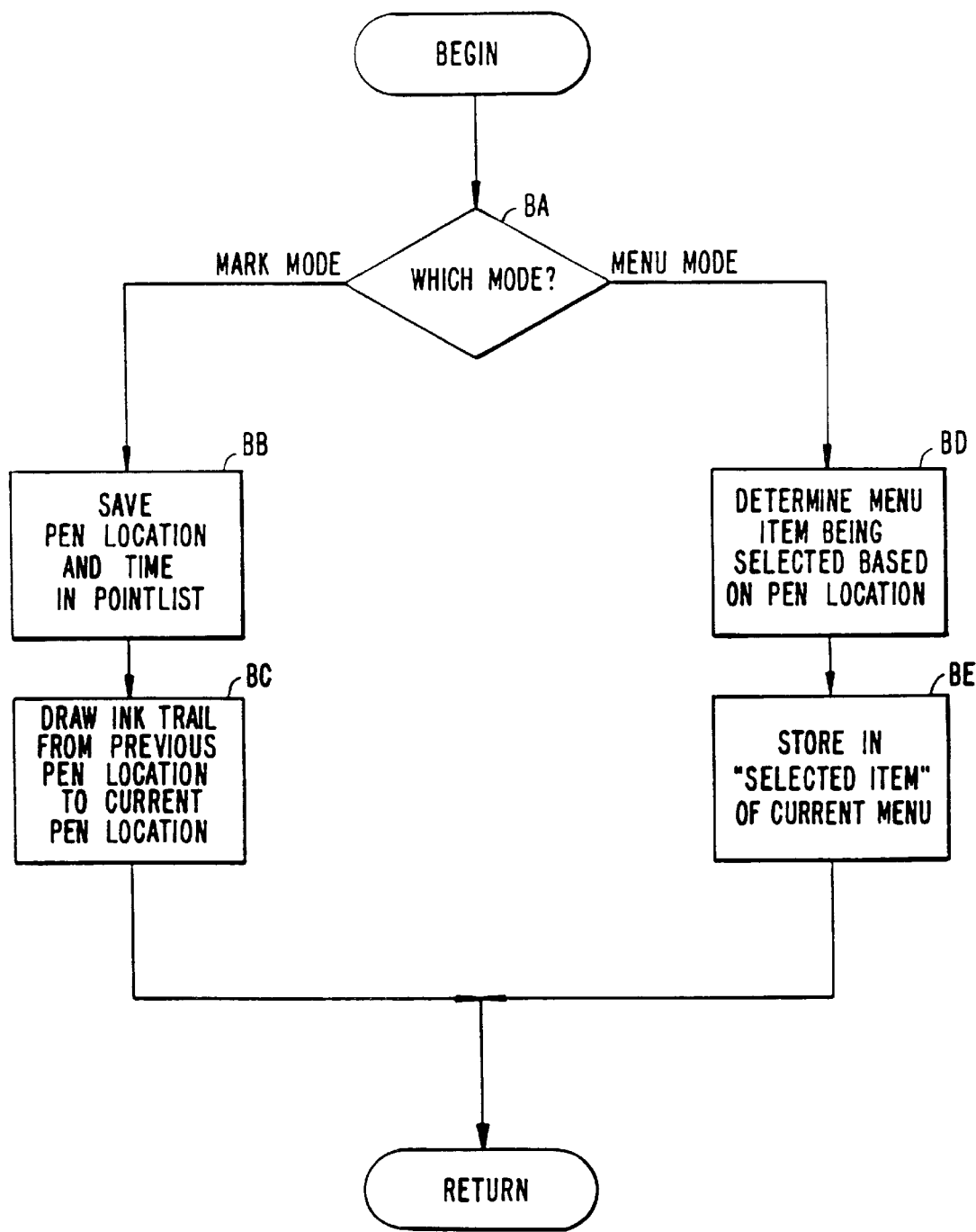
FIG. 23 is a flowchart of steps for processing a PenDrag event.

(2) PenDrag. If the event is a PenDrag event (Step B), the routine whose flowchart appears in FIG. 23 is executed. The current mode is determined by inspecting the ModeFlag (Step BA). If the current mode is mark mode, the pen location and time are saved as a Point in the current PointList (Step BB) and an ink trail is drawn from the previous pen location to the current pen location (Step BC). This causes a mark to appear on the display screen along the path of the pen as the pen is dragged. As the user drags the pen to make a mark, typically numerous PenDrag events are generated.

If the current mode is menu mode, a menu is already on the screen. A determination is made of which menu item is being selected based on the pen location (Step BD) and this selection is stored in the "selected item" field of the MM that represents the current menu (Step BE).

In menu mode, the user can select an item from the current menu by dragging the pen from the center circle of the displayed menu into a radial sector (i.e., a "pie slice") of the menu. As the user drags the pen, a series of PenDrag events occurs. The user can continue to move the pen, even outside the menu's perimeter, and the selection is maintained so long as the user stays within the angular boundaries of the sector. Moving the pen into another sector selects a different menu item and deselects the previously selected menu item. Thus the menu selection just described is a revocable one. The selection does not cause the graphical keyboard to generate a character or a modifier immediately. The actual application of the currently selected menu item to generate or modify a character occurs only on a PenUp event.

Figure 24:
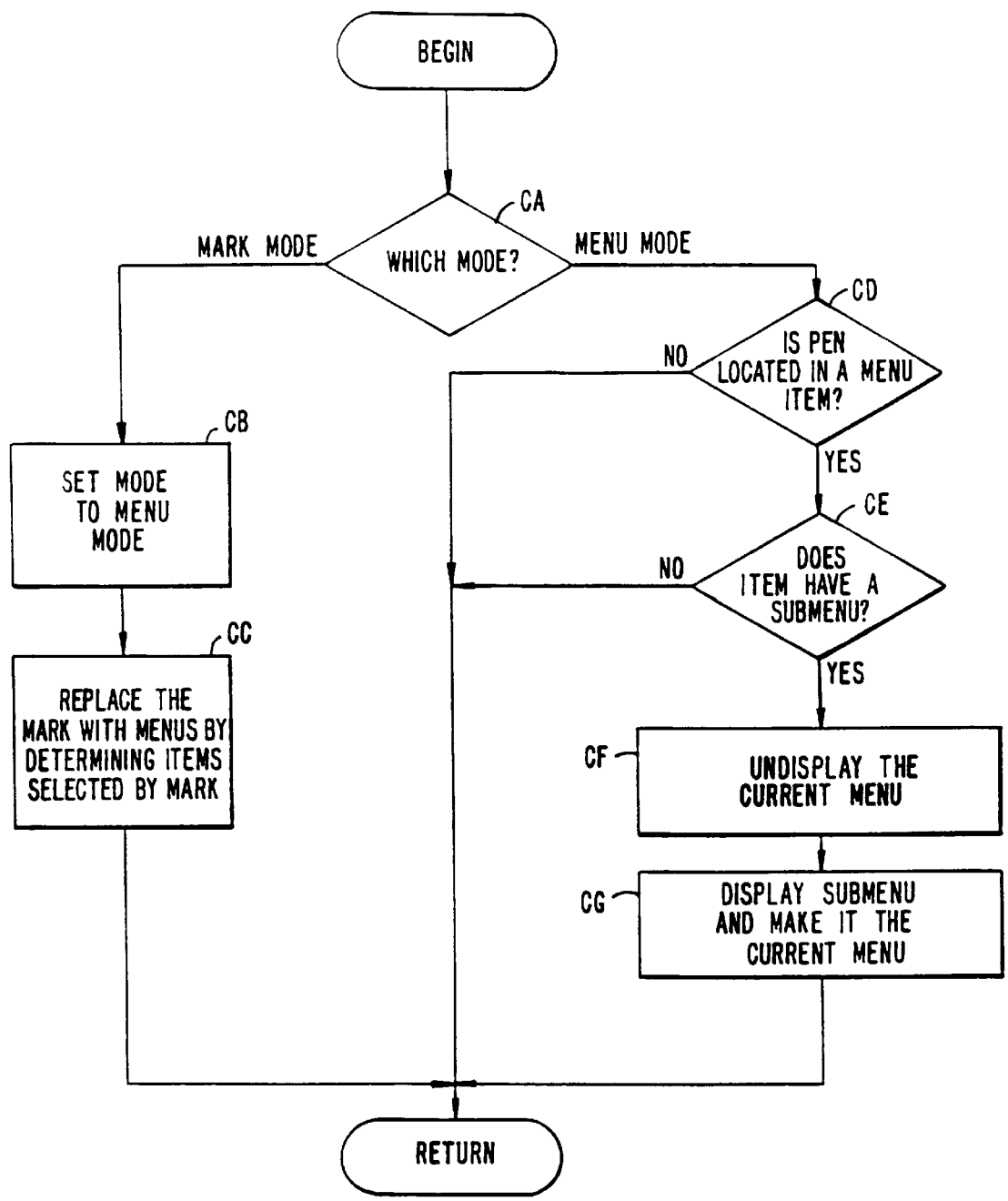
FIG. 24 is a flowchart of steps for processing a PenStill event.

(3) PenStill. If the event is a PenStill event (Step C), the routine whose flowchart appears in FIG. 24 is executed. The current selection mode is determined by inspecting the ModeFlag (Step CA). By holding the pen still, the user intends to cause menus to be displayed. Thus if the current mode is mark mode, the mode is switched to menu mode by toggling the ModeFlag(Step CB), and a routine is called to determine the menu selections corresponding to the mark that has been drawn so far (Step CC). This routine, which is a straightforward extension of the routine described below with reference to FIG. 26, updates the MM hierarchy to reflect the menus that have been selected and updates the display accordingly. The current menu (which can be either a top-level menu or a submenu) is displayed at the pen point location. Any mark that has been drawn is replaced in the display with one or more straight line segments that represent a schematic, cleaned-up version of the mark. If the mark includes no substantial changes of direction, a single straight line segment is displayed. The line segment has endpoints at the origin of the mark and at the pen point. If the mark substantially changes direction at one or more intermediate points, which typically indicates that the user intends to apply a compound modifier to the basic character, a zig-zag composed of distinct straight line segments is displayed. Each line segment of the zig-zag corresponds to a portion of the mark that includes no substantial changes in direction.

If the current mode is menu mode, a menu is already being displayed and the user presumably intends to select an item from that menu. Accordingly, if the pen is positioned within a sector of the displayed menu (Step CD), so as to indicate that the user has already selected an item from the displayed menu, and if there is a submenu corresponding to the indicated menu item (Step CE), the current menu is removed from the display (Step CF) and the submenu corresponding to the indicated menu item is displayed and becomes the current menu (Step CG). The MM hierarchy is updated accordingly. The example of FIG. 16 shows how this appears to the user: The second view of FIG. 16 shows a main menu being displayed, and the third view of FIG. 16 shows the main menu eliminated from the display and replaced by a submenu. If the pen is not within a sector of the displayed menu (Step CD) or there is no submenu corresponding to the indicated menu item (Step CE), the event response routine simply returns, leaving the current menu displayed.

Figure 25:
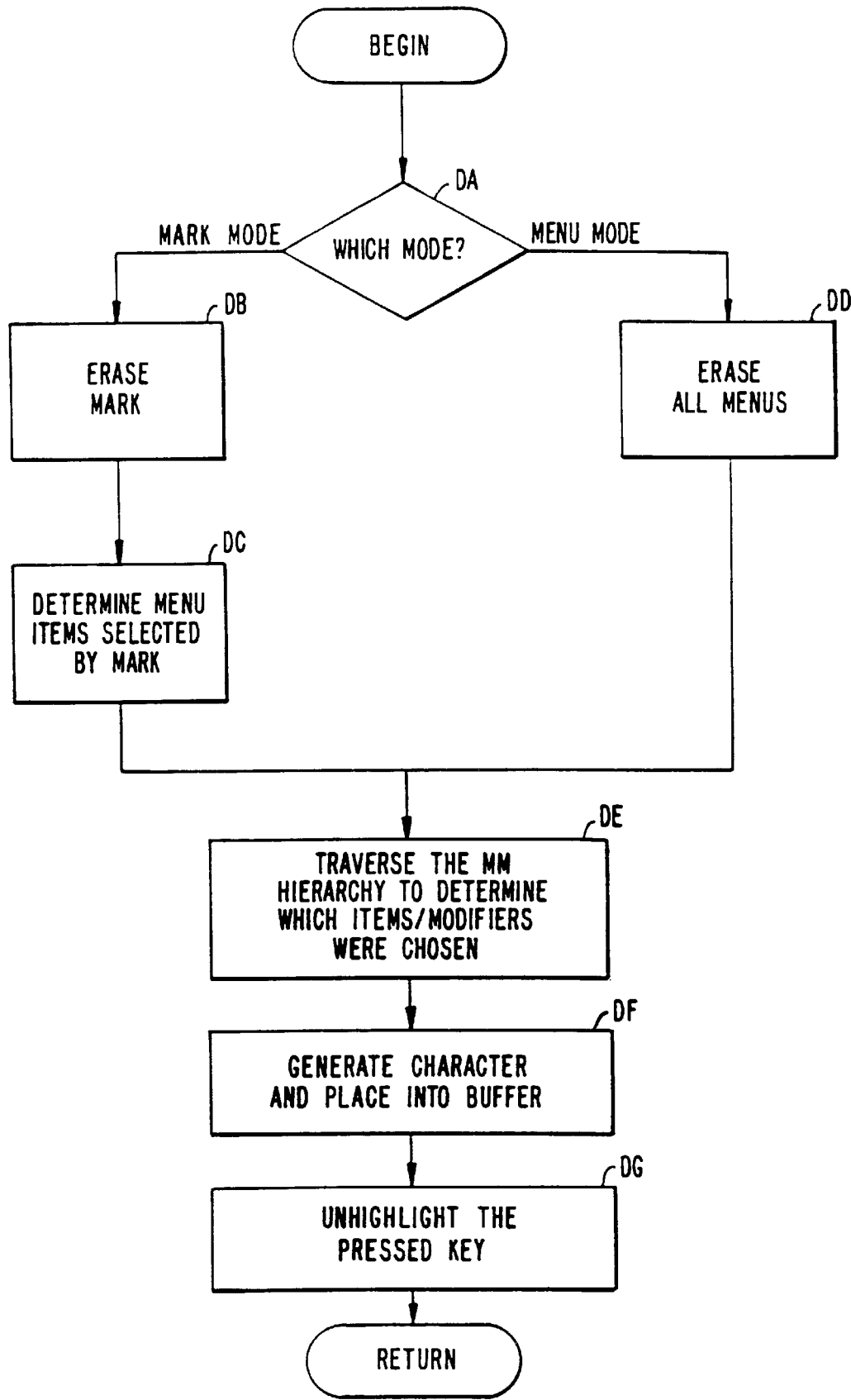
FIG. 25 is a flowchart of steps for processing a PenUp event.

(4) PenUp. If the event is a PenUp event (Step D), the routine whose flowchart appears in FIG. 25 is executed. The current selection mode is determined by inspecting the ModeFlag (Step DA). If the current mode is mark mode, any mark that has been drawn is erased from the display (Step DB), and the menu selections that correspond to the mark are determined according to the routine to be described below with reference to FIG. 26 (Step DC). After this determination, the MM hierarchy reflects the selected menu items. Thus the modifiers or special characters that correspond to the currently displayed menu and any menus previously displayed since the most recent PenDown event are reflected in the MM hierarchy. If the mode is menu mode, all menus and lines are erased from the display (Step DD). The routine for determining menu selections is not called in this case, because the MM hierarchy is already up to date.

By lifting the pen off the screen, the user intends to complete a mark and to cause the graphical keyboard to generate a character to be placed in the keyboard buffer. Accordingly (regardless of the current mode) the MM hierarchy is traversed to determine which modifiers or special characters were selected (Step DE). Then the appropriate character is generated according to and placed into character buffer 30 (Step DF). This character depends on the user's menu selections, which are encoded in the MM hierarchy. It can be a modified (or unmodified) version of the basic character whose key was pressed at the most recent PenDown event. For example, if the basic character is "a," and the "ctrl" and "uppercase" modifiers are selected, the output character is "^A." Alternatively, if the user's mark or menu selections indicate a special character such as backspace or return, that special character is the character to be generated, and the pressed key is ignored.

Finally, the key that was pressed is unhighlighted, that is, restored to its normal appearance in the display (Step DG). This completes the cycle of events, and the graphical keyboard is ready to accept a new character at the next PenDown event.

6.3 Determining Modifiers

Figure 26:
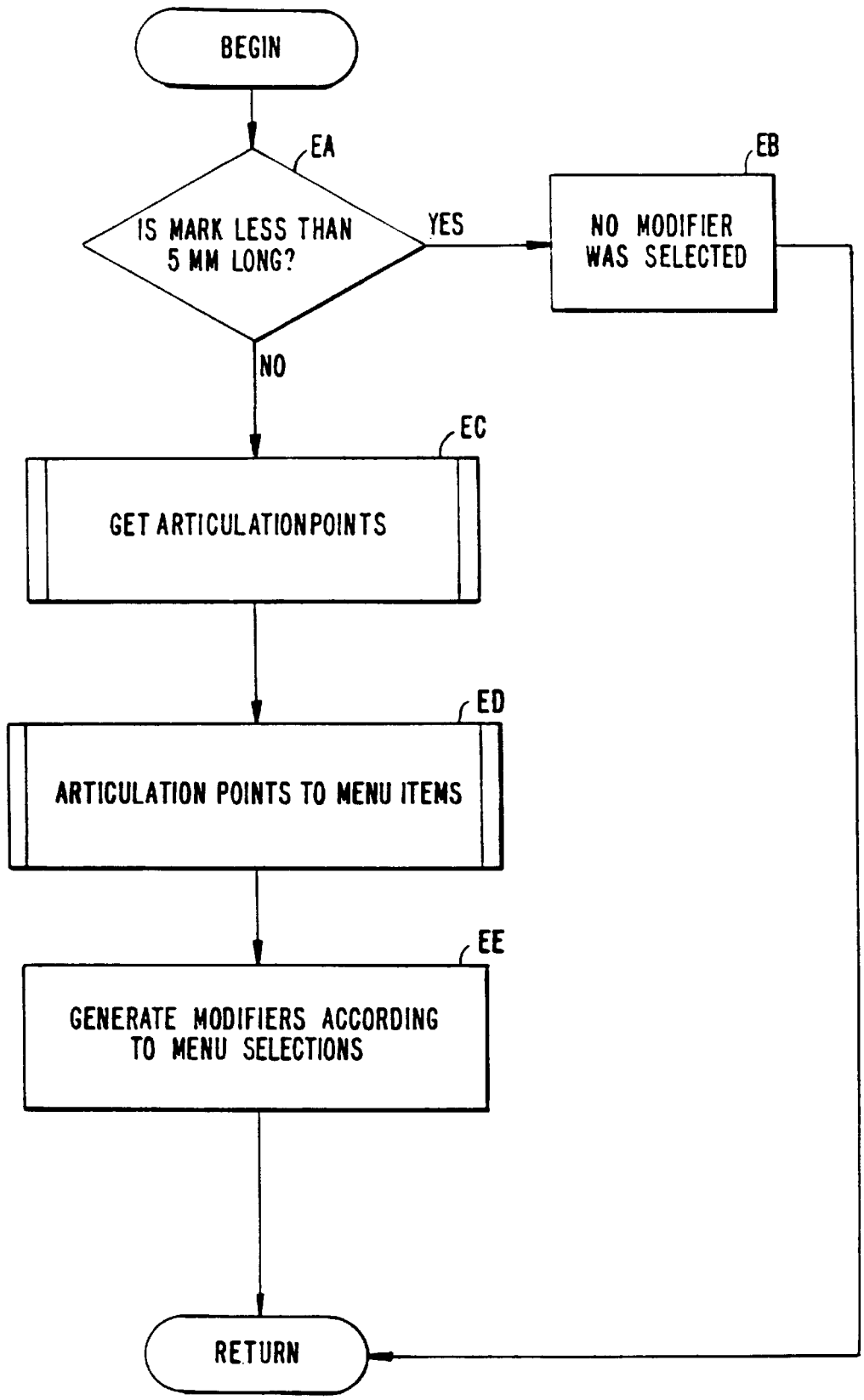
FIG. 26 is a flowchart of steps for determining the modifiers corresponding to a mark.

FIG. 26 flowcharts the steps of a routine for determining what modifiers (or special characters) correspond to a given mark drawn by the user. This routine is called in Step DC of FIG. 25, as part of the processing of a PenUp event. The routine accepts as input a mark (e.g., represented as a PointList) and returns as output a set (possibly the empty set) of modifiers.

Initially, the mark is tested to see if it is of appreciable length, e.g., longer than a test value such as 5 mm (Step EA). If the mark is shorter than the test value, it is considered not to be a mark at all, as though the user had simply tapped the key. In this case, the empty set is returned (Step EB).

If the mark is as long or longer than the test value, the mark is analyzed to determine its articulation points (Step EC). This analysis is carried out according to the routine that is described below with reference to FIG. 27. Thereafter, the articulation points are matched with the centers of corresponding menus and submenus to determine the selected modifiers (Step ED). This analysis is carried out according to the routine that is described below with reference to FIG. 28. According to these "effective" or "virtual" menu selections, a set of modifiers is generated and returned as output (Step EE).

6.4 Determining Articulation Points

Generally speaking, the articulation points of a mark are the points along the mark at which the user indicates selections from a menu or submenu. Typically, this includes the first (starting) and last (finishing) points of the mark and any points at which the mark undergoes a substantial directional change. For example, if the radial menu has eight items, so that each sector of the menu occupies 45 degrees, a change of greater than about 22.5 degrees in angular heading can be considered substantial. Substantial angular changes are determined after the mark has been filtered for noise and jitter.

Figure 27:
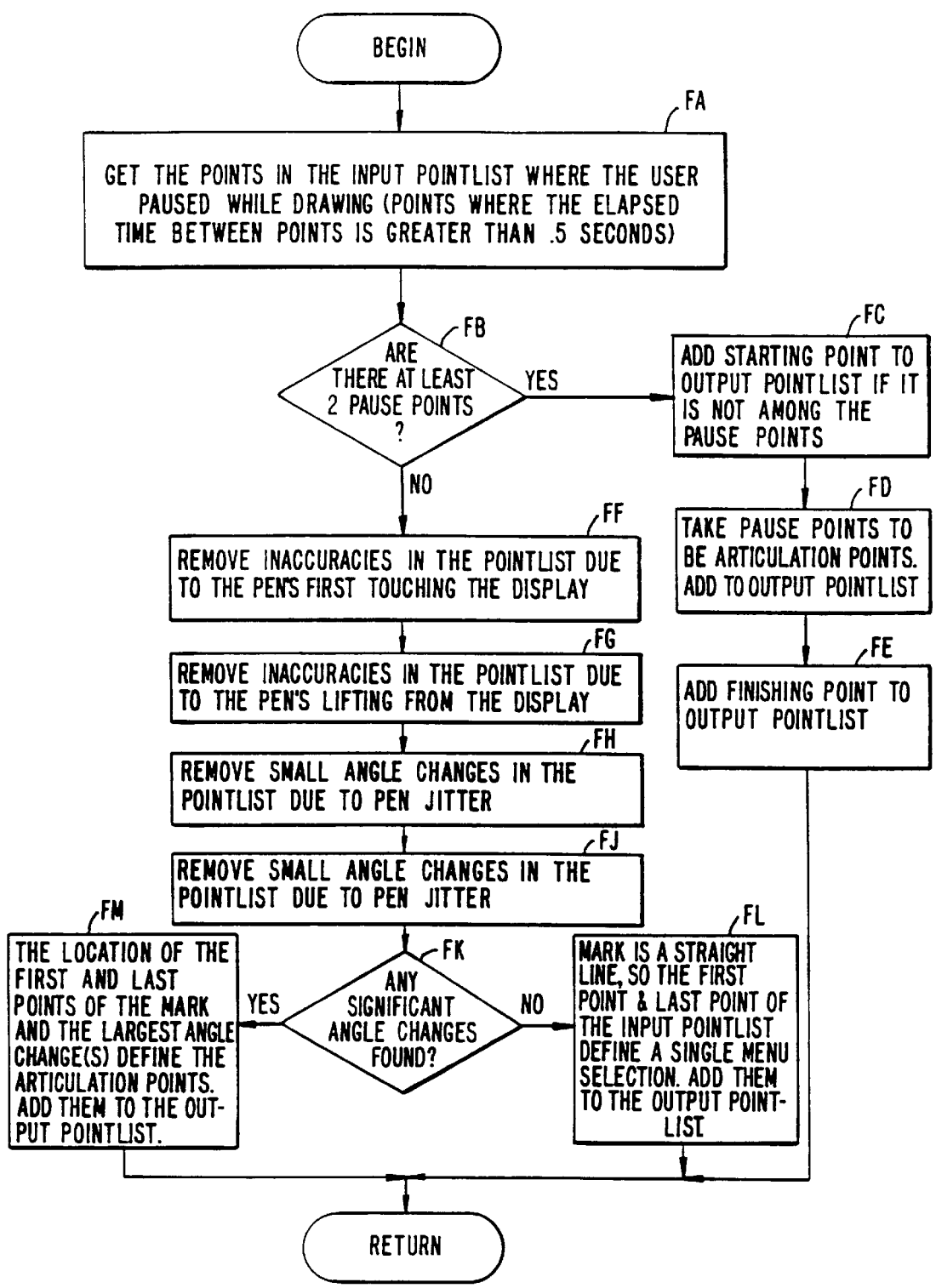
FIG. 27 is a flowchart of steps for determining points of articulation along a mark.

More specifically, the articulation points of a mark are determined in one embodiment according to the routine whose flowchart appears in FIG. 27. This routine, which in this embodiment is called GetArticulationPoints, is called in Step EC of FIG. 26. The routine accepts as input the PointList for the current mark (the input PointList) and outputs another PointList (the output PointList) which contains only the articulation points.

At the start of the routine, the input PointList is examined to determine whether and where the user paused significantly while drawing the mark (Step FA). This can be done, for example, by seeking pairs of points between which the elapsed time is greater than a specified delay time such as 0.5 seconds. (Typically the value used for the delay time here is less than the value used for the delay time used to trigger a PenStill event.)

If at least two pause points are found (Step FB), then if the starting point of the mark is not included among the pause points, it is added to the output PointList (Step FC). The pause points are then without further analysis taken to be articulation points and are added to the end of the output PointList in the order of their appearance in the input PointList (Step FD). The finishing point of the mark is then added to the very end of the output PointList (Step FE). This completes the routine.

If fewer than two pause points are found, the input PointList is analyzed further. First, the data of the PointList is preprocessed to remove certain inaccuracies and artifacts. In particular, inaccuracies that occur when the pen first touches the display are removed (Step FF), as are inaccuracies that occur when the pen is finally lifted from the display (Step FG). Also, small angle changes due to pen jitter are filtered out (Step FH).

After the PointList has been "cleaned up" in this manner, it is searched to detect points at which the mark forms a significant angle—that is, points at which the direction of the pen's motion changes sufficiently that a menu selection would be made if the menus were being displayed. This can be done, for example, by locating Points for which the value of φ exceeds a threshold angle (Step FJ). The threshold angle typically depends on the number of menu choices. For example, if the marking menus support 8 choices, as is the case for the menus illustrated in the example of FIG. 14, then angular changes of greater than about 22.5 degrees can be considered significant and the threshold angle can be set to 22.5 degrees. If the menus support only 4 choices, as is the case for the menus illustrated in the examples of FIGS. 15 and 16, then the threshold angle can be set to 45 degrees.

If no significant angular changes are detected (Step FK), the mark is considered to be a straight line, so that the first and last points of the mark are placed in the output PointList to be returned as the articulation points (Step FL). Otherwise, if one or more significant angular changes are detected, the mark is considered to include an angle or angles, so that the first point, last point, and the point or points of largest angular change are placed in the output PointList to be returned as the articulation points (Step FM). This completes the routine.

6.5 Matching Articulation Points with Corresponding Menus

Figure 28:
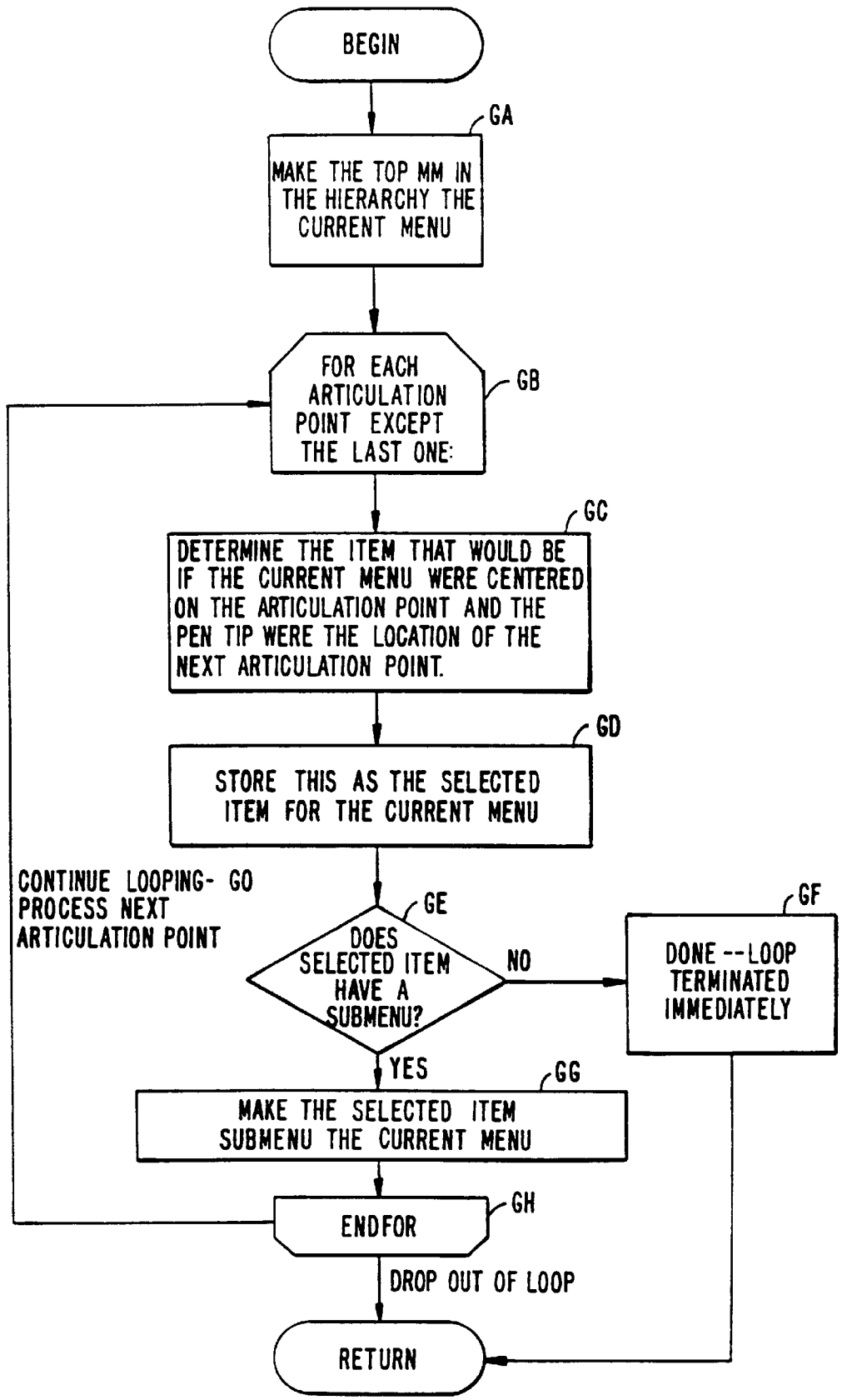
FIG. 28 is a flowchart of steps for matching points of articulation along a mark with centers of corresponding menus.

Generally speaking, once the articulation points have been found, the mark is interpreted as though the system had been in menu mode and the user had paused each articulation point, so that the appropriate menu and submenu(s) had been displayed at the articulation points of the mark. More specifically, in one embodiment the routine whose flowchart appears in FIG. 28 is used to interpret the articulation points. This routine, which in this embodiment is called ArticulationPointsToMenuItems, is called in Step ED of FIG. 26.

ArticulationPointsToMenuItems accepts as input the PointList that contains the articulation points for the current mark, which was returned as the output PointList from the GetArticulationPoints routine called in Step EC of FIG. 26, and also the hierarchy of MM data structures that describes the hierarchy of menus and submenus that can be displayed. The routine outputs the MM hierarchy with the appropriate selected items, which represents the set of modifiers.

The routine begins by selecting the topmost menu from the MM hierarchy to be the current menu (Step GA). Thereafter the routine loops until either the hierarchy of menus is exhausted or the list of articulation points is exhausted, whichever comes first.

More particularly, the loop proceeds as follows: For each articulation point in the PointList other than the last one (Step GB), a corresponding menu selection is determined (Step GC). This is the menu item that would be selected if the current menu were centered on the current articulation point and the pen were positioned at the location of the next articulation point in the PointList. The menu selection is stored as the "selected item" for the current menu by making appropriate modifications to the contents of the MM data structure that represents the current menu (Step GD). Then a test is made to determine whether the selected menu item has a submenu associated with it. If the selected item has no submenu (Step GE), the menu hierarchy is exhausted and the routine is complete. In this case, the loop terminates immediately (Step GF). Otherwise, the submenu is taken as the new current menu (Step GG) and the loop repeats until all articulation points other than the last one have been processed (Step GH). The routine is then complete. Upon return from this routine, the hierarchy of MM data structures reflects the set of selected menu items, and thus the set of modifiers to be generated and returned in Step EE of FIG. 26.

6.6 Using Event Sequences to Generate Characters

Sequences of events triggered by user actions cause the graphical keyboard to generate characters. For example, if a user wants to enter a lowercase character, such as "a," the user taps the pen on the desired key of the keyboard image. This gives rise to the sequence of events (PenDown, PenUp). This event sequence, in turn, causes the steps associated with these events to be performed by system 1 according to the logic of the flowchart of FIG. 21. More particularly, upon the occurrence of the PenDown event, processor 5 determines which key of keys 26 is pressed, causes that key to be highlighted in display screen 22, sets the mode to marking, and saves the location of pen 10. Thereafter, upon the occurrence of the PenUp event, processor 5 determines that the mode is marking. Because no mark has been made and no modifier has been applied, processor 5 simply unhighlights the key in display screen 22 and places the unmodified character corresponding to the key into character buffer 30.

To enter a modified character, such as "A"'^a," or "^A," without causing menus to be displayed, the user touches the pen to the desired key, drags the pen to make the desired mark, and then lifts the pen. This gives rise to the sequence of events (PenDown, PenDrag, PenDrag, PenDrag . . . PenDrag, PenUp) and causes the appropriate associated steps to be carried out. More particularly, upon the occurrence of the PenDown event, processor 5 determines which key of keys 26 is pressed, causes that key to be highlighted in display screen 22, sets the mode to marking, and saves the location of pen 10. Thereafter, upon the occurrences of the PenDrag events, processor 5 determines that the mode is marking, saves the current location of pen 10, and updates the ink trail displayed on screen 22. Thereafter, upon the occurrence of the PenUp event, processor 5 determines that the mode is marking, erases the ink trail from the display of screen 22, and determines which modifier or modifiers have been chosen according to the articulation points in the mark. Also, processor 5 unhighlights the key in display screen 22 and places the modified character corresponding to the key into character buffer 30.

Similarly, to generate a frequently used character that is represented by a diagonal mark, such as backspace or return, without causing menus to be displayed, the user touches the pen to any key, drags the pen to make the desired mark, and then lifts the pen. Again this gives rise to the sequence of events (PenDown, PenDrag, PenDrag, PenDrag . . . PenDrag, PenUp) and causes the appropriate associated steps to be performed.

To use menus to enter a character having a single modifier, such as "A" or "^a," the user touches the pen to the desired key and holds it there for a sufficient time for a menu to appear (e.g., for 0.3 seconds). The user makes the desired menu selection by dragging the pen, and then lifts the pen. This gives rise to the sequence of events (PenDown, PenStill, PenDrag, PenDrag, PenDrag . . . PenDrag, PenUp), and the appropriate associated steps to be performed. Similarly, to generate a frequently used character that is represented by a diagonal mark, such as backspace or return, using displayed menus, the user touches the pen to any key, holds it still until the menu appears, makes the desired menu selection by dragging the pen, and then lifts the pen. Again this gives rise to the sequence of events (PenDown, PenStill, PenDrag, PenDrag, PenDrag . . . PenDrag, PenUp) and causes the appropriate associated steps to be carried out.

To use menus to enter a character having a double modifier, such as "^A," the user touches the pen to the desired key, holds it there until the menu appears, makes the desired selection, holds the pen still again until the next menu appears, makes the desired selection, and lifts the pen. This gives rise to the sequence of events (PenDown, PenStill, PenDrag, PenDrag, PenDrag . . . PenDrag, PenStill, PenDrag, PenDrag, PenDrag . . . PenDrag, PenUp) and causes the appropriate associated steps to be performed. Similarly, the user can add yet further modifiers using menus by continuing to drag and then hold still the pen as needed. Thus to use menus to enter a triply modified character, such as "command-option-A," the user touches the pen to the desired key, holds it there until the menu appears, makes the desired selection, holds the pen still again until the next menu appears, makes the desired selection, holds the pen still yet again until the next menu appears, makes the desired selection, and lifts the pen. This gives rise to the sequence of events (PenDown, PenStill, PenDrag, PenDrag, PenDrag . . . PenDrag, PenStill, PenDrag, PenDrag, PenDrag . . . PenDrag, PenStill, PenDrag, PenDrag, PenDrag . . . PenDrag, PenUp) and causes the appropriate associated steps to be performed.

The user can also use the mark confirmation feature of marking menus to obtain a menu display during the process of making a mark representing a compound modifier. For example, if the user touches the pen to a key, drags the pen to the right and then upward (substantially without pausing during the change of direction), and then holds the pen still without lifting it away from the screen, thereafter the menu for the rightward mark and submenu for the upward mark are both displayed. The sequence of events for this example is (PenDown, PenDrag, PenDrag, . . . PenDrag, Pendrag, PenStill). Once again, the appropriate associated steps are carried out.

Still other combinations of events can be supported in some embodiments. For example, in some embodiments a modifier can be applied to a character generated by a diagonal stroke.

7. Discussion of the Software

A current embodiment of the invention is implement in software on a digital computer and supports singly modified characters. The source code (unpublished work, copyright ©1993 Xerox Corporation) includes a single source code file. The file is written in the HyperCard scripting language for the Apple Macintosh family of computers. The HyperCard stack consists of graphical buttons that correspond to keyboard keys and field to display typed in characters as discussed above with respect to FIGS. 1–10. The HyperCard script that is associated with each button (key) in the present invention is as follows:

```
on mouseDown
    put the short name of me into key
    doKeyAction key
end mouseDown
```

The following HyperCard script is associated with the HyperCard Stack. The function MMHyper is an XMCD which takes a string that describes menu items and displays these as marking menus and handles the interaction. It returns the index of a menu item selected or 0 is nothing was selected. MMHyper calls the marking menu 'C' code described elsewhere.

```
on openStack
    go to first card
end openStack
on doKeyAction key
    put to UpperCase (key) into upperKey
    put " " & upperKey & "|" & key & "|option " & key & "|
control"& key & " " into label
    put MMHyper (label) into item
    ketAction item, key
end doKeyAction
on keyAction item, key
    if item is 1
    then
        put toUpperCase (key) into keyTrans
    else if item is 2
    then
        put "apple" & key into keyTrans
    else if item is 3
    then
        put "option' & key into keyTrans
    else if item is 4
    then
        put "control" & key into keyTrans
    else
        put key into keyTrans
    end if
    put card field keyOut into start
    put start & keyTrans into card field keyOut
end keyAction
function to UpperCase c
    put chartonum (c) - 32 into keyCode
    put numtochar (keycode) into upperKey
    return upperKey
end to UpperCase
```

8. Conclusion

The present invention provides a simple and easy-to-implement technique that enables commands and data, such as alphanumeric data, to be entered accurately and efficiently into a pen-based computer via a graphical keyboard. The graphical keyboard allows a user to make use of existing knowledge of keyboard entry. The use of strokes and marking menus provides accelerated input. Because of the self-revealing nature of marking menus, these accelerators are accessible to novices. They are also valuable to experienced users who may need to refamiliarize themselves with the menus from time to time, for example, if larger menus with a greater variety of commands are installed as part of a software upgrade to the graphical keyboard.

The graphical keyboard of the invention offers improved ease of use over existing graphical keyboards. For example, the graphical keyboard of the invention is modeless. In previous graphical keyboards, tapping a modifier key set a mode (e.g., shift mode) that explicitly had to be released. This inconvenience and awkwardness is avoided in the present invention. Moreover, the graphical keyboard of the invention can be made smaller in terms of screen display size than previous graphical keyboards, inasmuch as modifier keys and certain command keys such as space and delete need not be explicitly represented. Still further, the graphical keyboard of the invention allows users to proceed "by feel"—that is, to apply multiple modifiers and to input stroke-based commands without looking at the displayed keyboard every step of the way. Numerous other advantages of the invention will be apparent to those of skill in the art.

The invention has relevance to most pen-based and stylus-based computing systems. In particular, the invention lends itself to easy retrofit to existing applications. All that is needed for such a retrofit is to build a module that the computer system sees as equivalent to the standard mechanical keyboard.

The invention has been explained with reference to specific embodiments. Other embodiments are contemplated without departing from the spirit and scope of the invention. For example, the basic character to be modified by a mark can be designated according to the finishing point rather than the starting point of the mark. The mark can also be decoupled from the key designation; for example, the user can indicate the key with a tap to the screen and then draw the mark separately. Different kinds of strokes, such as double taps (two taps of the stylus in rapid succession, analogous to the "double click" of a mouse button), can be used with the invention. Likewise, pen pressure or velocity can be used to encode command information. Different kinds of commands can be implemented, such as font size commands. Alternate menu layouts can be used for pop-up menus. Menus need not be organized hierarchically. Different kinds of graphical keyboards and keyboard layouts can be used. Moreover, the invention can be applied in systems other than those ordinarily thought of as pen-based; in particular, it finds application in systems in which a finger, a mouse, a laser beam, or any one of myriad other instruments analogous to a pen is used in lieu of a mechanical keyboard to input characters. Still further variations and extensions will be apparent to those of skill in the art within the scope of the invention. It is therefore not intended that this invention be limited, except as indicated by the appended claims.

What is claimed is:

1. A user interface apparatus for a computing system, said apparatus comprising:
    a display device displaying a graphical keyboard image;
    an input source comprising a designating device, said input source providing an input comprising key information and path information, said key information representing a key of said graphical keyboard image, said path information representing a series of points designated by said designating device, wherein said path information comprises a direction of displacement of said designating device;
    an output generator, responsive to said key information and said path information provided by said input source, for producing a keycode data defing an output character by applying a modifier corresponding to said path information to an input character corresponding to said key information, with said modifier being determined according to said direction of displacement; and
    a buffer, wherein said keycode data produced by said output generator is stored in said buffer.

2. The apparatus of claim 1 wherein:
    said graphical keyboard image comprises a representation of a plurality of characters; and
    said key information provided by said input source comprises a character to which said key corresponds.

3. The apparatus of claim 1 wherein said input source further comprises a sensor responsive to a plurality of positions of said designating device, said sensor providing said input source with position information about said designating device during a manipulation of said designating device, said position information determining said points of said series.

4. The apparatus of claim 3 wherein said sensor is integrated with said display device and said positions of said plurality include positions in a vicinity of said displayed graphical keyboard image throughout a substantial portion of said manipulation of said designating device.

5. The apparatus of claim 1 wherein said designating device comprises a pointing device selected from the group consisting of a pen, a light pen, a stylus, a pencil, a pointer, a mouse, a trackball, a joystick, or a finger.

6. The apparatus of claim 1 wherein said designating device comprises a cursor displayed by said display device, said cursor providing a representation of a position of a plurality of positions, a displacement of said cursor determining said points of said series.

7. The apparatus of claim 1 wherein said modifier is selected from the group consisting of shift, uppercase, control, alt, option, and command.

8. The apparatus of claim 1 wherein said keycode data corresponds to said path information and is independent of said key information.

9. The apparatus of claim 8 wherein said keycode data is a special character selected from the group consisting of return, space, backspace, and delete.

10. The apparatus of claim 1 wherein said input source provides said key information according to a position of said designating device relative to said graphical keyboard image.

11. The apparatus of claim 1 wherein said input source provides said key information according to one point of said series.

12. The apparatus of claim 11 wherein said one point is a starting point of said series.

13. The apparatus of claim 1 wherein said display device further displays a representation of said path information.

14. The apparatus of claim 13 wherein said representation of said path information comprises a mark corresponding to said path information, said mark being displayed in conjunction with said graphical keyboard image.

15. The apparatus of claim 13 wherein said representation of said path information comprises an ink trail corresponding to said series of points displayed in the vicinity of said graphical keyboard image.

16. The apparatus of claim 13 wherein said representation of said path information comprises a menu displayed in conjunction with said graphical keyboard image.

17. In a computing system comprising a processor, a sensor, a display, and a buffer, a method for using a graphical keyboard to produce and store a keycode data, said method comprising the steps of:
    displaying on said display a graphical keyboard image;
    sensing with said sensor a motion of a pen device relative to said sensor, said pen device being maintained proximate to said sensor throughout a substantial portion of said motion;

using said processor to generate said keycode data responsively to said motion by determinant an unmodified character according to an initial position of said pen device at a starting point of said motion, determining a modifier according to a path taken by said pen device during said motion, and applying said modifier to said unmodified character; and receiving and storing in said buffer said keycode data thus generated.

18. The method of claim 17 wherein said step of using said processor to generate said keycode data comprises the step of:

determining a special character according to a path taken by said pen device during said motion and independently of an initial position of said pen device at a starting point of said motion.

* * * * *